United States Patent
Ha et al.

(10) Patent No.: US 12,374,929 B2
(45) Date of Patent: Jul. 29, 2025

(54) ELECTRONIC DEVICE FOR WIRELESSLY TRANSMITTING POWER AND OPERATION METHOD THEREOF

(71) Applicant: Samsung Electronics Co., Ltd., Suwon-si (KR)

(72) Inventors: Mincheol Ha, Suwon-si (KR); Kihyun Kim, Suwon-si (KR); Dongzo Kim, Suwon-si (KR); Jihye Kim, Suwon-si (KR); Yunjeong Noh, Suwon-si (KR); Keyic Son, Suwon-si (KR); Taehyeon Yu, Suwon-si (KR); Kyungmin Lee, Suwon-si (KR); Hyungkoo Chung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 130 days.

(21) Appl. No.: 18/119,543

(22) Filed: Mar. 9, 2023

(65) Prior Publication Data
US 2023/0216353 A1 Jul. 6, 2023

Related U.S. Application Data

(63) Continuation of application No. PCT/KR2021/009359, filed on Jul. 20, 2021.

(30) Foreign Application Priority Data

Sep. 9, 2020 (KR) .................. 10-2020-0115639

(51) Int. Cl.
*H02J 50/40* (2016.01)
*H02J 50/12* (2016.01)
(Continued)

(52) U.S. Cl.
CPC ............ *H02J 50/402* (2020.01); *H02J 50/12* (2016.02); *H02J 50/90* (2016.02); *H02M 1/0003* (2021.05)

(58) Field of Classification Search
CPC .......... H02J 50/402; H02J 50/12; H02J 50/90; H02J 50/10; H02J 50/80; H02J 2207/20;
(Continued)

(56) References Cited

U.S. PATENT DOCUMENTS 9,577,466 B2 * 2/2017 Ku ........................... H02J 50/90
9,866,036 B2 * 1/2018 Asaoka .................... H02J 50/90
(Continued)

FOREIGN PATENT DOCUMENTS

JP 2017077058 A 4/2017
KR 20170061893 A 6/2017
(Continued)

OTHER PUBLICATIONS

Search Report issued in European Patent Application No. 21866988. 5; Application Filing Date Jul. 20, 2021; Date of Mailing Feb. 6, 2024 (7 pages).

(Continued)

*Primary Examiner* — Daniel Kessie
*Assistant Examiner* — Brian K Baxter
(74) *Attorney, Agent, or Firm* — CANTOR COLBURN LLP

(57) ABSTRACT

An electronic device includes a plurality of coils, power conversion circuits, demodulation switches, and a processor. The power conversion circuits convert DC power into AC power, and output the AC power to the plurality of coils, respectively. The demodulation switches selectively connect the plurality of coils to ground. The processor selects at least one coil from among the plurality of coils, and controls an on/off state of the demodulation switches to connect or
(Continued)

disconnect at least one remaining coil except for the selected at least one coil among the plurality of coils to the ground. The processor controls the power conversion circuits to output the AC power to the selected at least one coil and demodulates a signal of the selected at least one coil to identify information from an external electronic device disposed adjacent to a selected at least one coil based on the demodulation.

12 Claims, 20 Drawing Sheets

(51) Int. Cl.
*H02J 50/90* (2016.01)
*H02M 1/00* (2006.01)

(58) Field of Classification Search
CPC .... H02M 1/0003; H02M 1/0074; H02M 7/48; H01F 38/14
See application file for complete search history.

(56) References Cited

U.S. PATENT DOCUMENTS

| | | | | |
|---|---|---|---|---|
| 9,960,643 | B2* | 5/2018 | Gao | H04B 5/79 |
| 10,033,440 | B2* | 7/2018 | Lisi | H04B 5/263 |
| 10,075,019 | B2* | 9/2018 | Buenrostro | H02J 50/80 |
| 10,340,736 | B2* | 7/2019 | Bae | H02J 50/10 |
| 10,511,192 | B2* | 12/2019 | Park | H02J 50/12 |
| 10,693,319 | B2* | 6/2020 | Hong | H02J 50/12 |
| 10,840,746 | B2* | 11/2020 | Zhou | H02J 50/80 |
| 10,892,647 | B2* | 1/2021 | Kim | H02J 50/80 |
| 11,133,711 | B2* | 9/2021 | Yeo | H02J 50/12 |
| 11,264,843 | B1* | 3/2022 | Lim | H02J 50/12 |
| 11,316,380 | B2* | 4/2022 | Kim | H02J 50/10 |
| 11,368,051 | B2* | 6/2022 | Lee | H02J 50/80 |
| 2011/0285211 | A1* | 11/2011 | Endo | H02J 50/12 |
| | | | | 307/104 |
| 2012/0326523 | A1* | 12/2012 | Fukushima | H01F 27/006 |
| | | | | 307/104 |
| 2014/0354222 | A1* | 12/2014 | Park | H02J 50/70 |
| | | | | 320/108 |
| 2015/0115726 | A1* | 4/2015 | Kang | H02J 50/10 |
| | | | | 307/104 |
| 2015/0303705 | A1* | 10/2015 | Leem | H02J 50/12 |
| | | | | 307/104 |
| 2015/0306966 | A1* | 10/2015 | Ichikawa | B60L 53/36 |
| | | | | 701/22 |
| 2016/0020637 | A1* | 1/2016 | Khlat | H02J 7/02 |
| | | | | 320/108 |
| 2016/0156229 | A1 | 6/2016 | Sakata et al. | |
| 2017/0093169 | A1* | 3/2017 | Keeling | H02J 50/12 |
| 2017/0104370 | A1 | 4/2017 | Watanabe et al. | |
| 2017/0133889 | A1* | 5/2017 | Yeo | H02J 50/12 |
| 2017/0294798 | A1 | 10/2017 | Yuk et al. | |
| 2017/0353054 | A1* | 12/2017 | Lee | H02J 5/00 |
| 2018/0072173 | A1* | 3/2018 | Hwang | H02J 7/00045 |
| 2018/0083474 | A1* | 3/2018 | Rajamäki | G06F 1/163 |
| 2018/0115175 | A1* | 4/2018 | Lin | G06F 1/1601 |
| 2018/0278099 | A1 | 9/2018 | Hong et al. | |
| 2018/0323634 | A1* | 11/2018 | Lee | H02J 50/90 |
| 2019/0123588 | A1* | 4/2019 | Kim | H04B 5/26 |
| 2019/0229773 | A1* | 7/2019 | Mao | H04B 5/72 |
| 2020/0067321 | A1* | 2/2020 | Bae | H02J 7/0042 |
| 2020/0076242 | A1* | 3/2020 | Narayana Bhat | H02J 7/00034 |
| 2020/0091836 | A1* | 3/2020 | Lee | H02M 7/4826 |
| 2020/0185967 | A1* | 6/2020 | Ogishima | H02J 50/402 |
| 2020/0204003 | A1* | 6/2020 | Lee | H02J 7/0013 |
| 2020/0244108 | A1* | 7/2020 | Kim | H04B 5/79 |
| 2020/0328626 | A1* | 10/2020 | Maniktala | H02J 50/10 |
| 2021/0090055 | A1* | 3/2021 | Lee | G06Q 30/0185 |
| 2021/0152028 | A1* | 5/2021 | Zhu | H02J 50/90 |
| 2021/0203191 | A1* | 7/2021 | Kim | H02J 50/23 |
| 2021/0218283 | A1* | 7/2021 | Cho | H01F 38/14 |
| 2021/0281118 | A1* | 9/2021 | Smith | H02J 7/00034 |
| 2021/0351627 | A1* | 11/2021 | Park | H02J 50/402 |
| 2022/0006328 | A1 | 1/2022 | Bae | |
| 2022/0060043 | A1* | 2/2022 | Hao | H02J 50/402 |
| 2022/0247229 | A1* | 8/2022 | Basak | H02J 50/90 |
| 2023/0081974 | A1* | 3/2023 | Zeng | B60L 53/36 |
| | | | | 320/108 |
| 2024/0186837 | A1* | 6/2024 | Basak | H02J 50/402 |

FOREIGN PATENT DOCUMENTS

| | | | |
|---|---|---|---|
| KR | 20170116952 | A | 10/2017 |
| KR | 20180086167 | A | 7/2018 |
| KR | 20180108317 | A | 10/2018 |
| KR | 20190090918 | A | 8/2019 |
| KR | 20200032458 | A | 3/2020 |
| KR | 20200045170 | A | 5/2020 |
| KR | 20200045249 | A | 5/2020 |
| KR | 20200077082 | A | 6/2020 |
| WO | 2007148401 | A1 | 12/2007 |
| WO | 2020024626 | A1 | 2/2020 |

OTHER PUBLICATIONS

International Search Report with Written Opinion for International Application No. PCT/KR2021/009359; Application Filing Date Jul. 20, 2021; Date of Mailing Oct. 26, 2021; 9 Pages.

Korean Office Action corresponding to Application No. 10-2020-0115639, Dated Nov. 5, 2024.

* cited by examiner (a)

(b)

(c)

ELECTRONIC DEVICE FOR WIRELESSLY TRANSMITTING POWER AND OPERATION METHOD THEREOF

CROSS-REFERENCE TO RELATED APPLICATION(S)

This application is a continuation application, claiming priority under § 365(c), of International Application No. PCT/KR2021/009359, filed on Jul. 20, 2021, which is based on and claims the benefit of Korean patent application number 10-2020-0115639, filed on Sep. 9, 2020, in the Korean Intellectual Property Office, the disclosures of which are incorporated by reference herein in their entireties.

TECHNICAL FIELD

Various embodiments relate to electronic devices wirelessly transmitting and methods for operating the same.

BACKGROUND ART

The use of portable electronic devices, such as smart phones, tablet PCs, or wearable devices, is increasing, and it is becoming increasingly common for one user to use multiple portable electronic devices. Since the portable electronic device may include a rechargeable secondary battery, the user may use the electronic device for a designated time even when a separate external power source is not provided. The secondary battery may be recharged in a wired scheme or a wireless scheme.

Wireless power transfer technology is a scheme for transferring power using the electromagnetic field induced around the coil and may supply electrical energy by generating an electromagnetic field by applying current to the transmission coil and forming an induced current through the reception coil by the generated electromagnetic field. A wireless charging scheme, for example, converts electrical energy into an electromagnetic wave having a frequency to be suited for different electronic devices and may wirelessly transfer it without directly plugging a transmission line into the electronic device. A charging pad, for example, is one example of a wireless power transmission device that may wirelessly charge one or more electronic devices).

DETAILED DESCRIPTION OF THE INVENTION

Technical Problem

An electronic device capable of wirelessly transmitting power may include a plurality of coils to provide a wider charging area. Accordingly, even when the user places the wireless power reception device at an arbitrary point on the charging area (e.g., the charging pad), charging may be performed by the corresponding coil of the charging area, thereby increasing the efficiency of wireless charging and ensuring the freedom of wireless charging. However, when the plurality of coils are disposed adjacent to each other, crosstalk between coils may occur.

The wireless power consortium (WPC) standard (or Qi standard) supports in-band communication between a wireless power transmission device and a wireless power reception device that transmits power wirelessly. A wireless power reception device supporting in-band communication may generate a change in load corresponding to information to be transmitted, e.g., based on an on/off keying modulation scheme. As the load of the wireless power reception device changes, the strength of voltage and/or current measured at the coil of the wireless power transmission device may change. A wireless power transmission device may demodulate a change in measurement information and identify information to be transmitted by the wireless power reception device based on the demodulation result.

When it is composed of a plurality of coils, the voltage and/or current of the coil performing in-band communication may decrease below the threshold according to the induction of current between coils, so that in-band communication may be cut off or noise from other coils may be introduced into the coil performing in-band communication.

The electronic device capable of wirelessly transmitting power may have power transmission/reception efficiency reduced due to mutual interference of electromagnetic fields between coils.

Technical Solution

Various embodiments of the disclosure may provide a wireless power transmission device that utilizes a plurality of coils to increase the degree of freedom of charging and wireless charging efficiency.

Various embodiments of the disclosure may provide a wireless power transmission device capable of reducing mutual interference of electromagnetic fields between coils.

According to various embodiments, an electronic device may comprise a plurality of coils, a plurality of power conversion circuits configured to respectively receive DC power, convert the DC power into AC power, and output the AC power to the plurality of coils, respectively, a plurality of demodulation switches configured to connect demodulation paths, which respectively correspond to the plurality of coils selectively to a ground. A processor is configured to select at least one coil from among the plurality of coils, control an on/off state of each of the plurality of demodulation switches to allow a demodulation path corresponding to at least one remaining coil except for the selected at least one coil among the plurality of coils to be connected to the ground and to allow a demodulation path corresponding to the selected at least one coil not to be connected to the ground, supply the AC power to the selected at least one coil, and demodulate a signal of the selected at least one coil and identify information from an external electronic device disposed corresponding to the selected at least one coil based on a result of the demodulation.

According to various embodiments, an electronic device may comprise a first group of coils, a first power conversion circuit electrically connected with the first group of coils to supply AC power to generate a first electromagnetic field using at least one coil of the first group of coils, a second group of coils, a second power conversion circuit electrically connected with the second group of coils to supply AC power to generate a second electromagnetic field using at least one coil of the second group of coils, and at least one processor operatively connected to the first power conversion circuit and the second power conversion circuit. The at least one processor may be configured to supply AC power to at least one or more coils of the first group of coils using the first power conversion circuit, supply AC power to at least one or more coils of the second group of coils using the second power conversion circuit, receive first information about the first group of coils, receive second information about the second group of coils, select a coil to perform charging of a first coil of the first group of coils or a second coil of the second group of coils based on a result of comparing the first information and the second information, and control the first power conversion circuit or the second power conversion circuit to charge with the selected coil.

A method for operating an electronic device comprising a plurality of coils, a plurality of power conversion circuits configured to respectively receive DC power, convert the DC power into AC power, and output the AC power to the plurality of coils, respectively, a plurality of demodulation switches configured to selectively connect demodulation paths, which respectively correspond to the plurality of coils selectively to ground and a processor. The method may comprise selecting at least one coil from among the plurality of coils, controlling an on/off state of each of the plurality of demodulation switches to allow a demodulation path corresponding to at least one remaining coil except for the selected at least one coil among the plurality of coils to be connected to the ground and to allow a demodulation path corresponding to the selected at least one coil not to be connected to the ground, supplying the AC power to the selected at least one coil, and demodulating a signal of the selected at least one coil and identifying information from an external electronic device disposed corresponding to the selected at least one coil based on a result of the demodulation.

Advantageous Effects

According to various embodiments, there may be provided an electronic device and method for operating the same, which may selectively ground a demodulation path corresponding to remaining coils except for an in-band communication performing coil among a plurality of charging coils. Accordingly, issues caused by crosstalk between coils may be alleviated or even completely avoided.

According to various embodiments, there may be provided an electronic device and a method for operating the same, which may select a coil corresponding to a reception coil of an external electronic device among a plurality of charging coils. Accordingly, wireless charging efficiency may be increased and malfunctions may be reduced.

MODE FOR CARRYING OUT THE INVENTION

Figure 1:
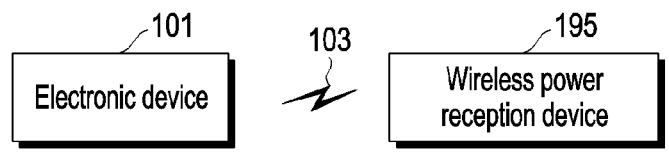
FIG. 1 is a block diagram illustrating a wireless power transmission device and an electronic device according to various embodiments.

FIG. 1 is a block diagram illustrating a wireless power transmission device and an electronic device according to various embodiments.

Referring to FIG. 1, according to various embodiments, an electronic device 101 may wirelessly transmit power 103 to a wireless power reception device 195. The electronic device 101 may transmit the power 103 to the wireless power reception device 195 according to various charging schemes. For example, the electronic device 101 may transmit the power 103 by an induction scheme. One of ordinary skill in the art will understand that, according to various embodiments, the electronic device 101 may be implemented as a device supporting a function of wirelessly transmitting power, such as a smartphone, a laptop computer, or a tablet PC, as well as a wireless charging pad.

Adopting an induction wireless transmission scheme, for example, the electronic device 101 may include, e.g., a power source, a direct current (DC)-alternating current (AC) converting circuit, an amplifying circuit, an impedance matching circuit, at least one capacitor, at least one coil, and/or a communication modulation/demodulation circuit. The at least one capacitor together with the at least one coil may constitute a resonance circuit. The electronic device 101 may be implemented in a scheme defined in the wireless power consortium (WPC) standards (or Qi standards).

According to another non-limiting embodiment, the electronic device 101 may transmit the power 103 by a resonance scheme. Adopting the resonance scheme, the electronic device 101 may include, e.g., a power source, a DC-AC converting circuit, an amplifying circuit, an impedance matching circuit, at least one capacitor, at least one coil, or an out-band communication circuit (e.g., a Bluetooth low energy (BLE) communication circuit). The at least one capacitor and the at least one coil may constitute a resonance circuit. The electronic device 101 may be implemented in a manner defined in the alliance for wireless power (A4WP) standards (or air fuel alliance (AFA) standards). The electronic device 101 may include a coil that is capable of produce a magnetic field when letting an electric current flow thereacross by a resonance or induction scheme. The process of the electronic device 101 producing an induced magnetic field may be represented as the electronic device 101 wirelessly transmitting the power 103. Further, the wireless power reception device 195 may include a coil that produces an induced electromotive force by the magnetic field generated around and varying in magnitude over time. The process of producing an induced electromotive force through the coil may be represented as the 'wireless power receiver 195 wirelessly receives the power 103. Alternatively, the wireless power reception device 195 according to the induction scheme may also perform out-of-band communication.

According to various embodiments of the present disclosure, the electronic device 101 may communicate with the wireless power reception device 195. For example, the electronic device 101 may perform communication with the wireless power reception device 195 using at least one coil for wireless charging and/or a frequency range for transmitting wireless power according to an in-band scheme. The electronic device 101 or the wireless power reception device 195 may vary the load (or impedance) on the data to be transmitted, according to, e.g., an on/off keying modulation scheme. The electronic device 101 or the wireless power reception device 195 may determine data transmitted from its opposite device by measuring a variation in load or impedance based on a variation in the current, voltage, or power across the coil. For example, the electronic device 101 may communicate with the wireless power reception device 195 according to an out-band scheme. The electronic device 101 or the wireless power reception device 195 may communicate data using a communication circuit (e.g., a BLE communication module) provided separately from the coil or patch antennas.

As set forth herein, when the electronic device 101 or the wireless power receiver 195 performs a particular operation, this may mean that various hardware devices, e.g., a control circuit, such as a processor (e.g., a transmission integrated circuit (IC) or micro controlling unit (MCU)), or coil included in the electronic device 101 or the wireless power receiver 195 performs the particular operation. When the electronic device 101 or the wireless power reception device 195 performs a particular operation, this may also mean that the processor controls another hardware device to perform the particular operation. When the electronic device 101 or the wireless power receiver 195 performs a particular operation, this may mean that the processor or another hardware device triggers the particular operation as an instruction for performing the particular operation, which is stored in a storage circuit (e.g., a memory) of the electronic device 101 or the wireless power receiver 195, is executed.

Figure 2:
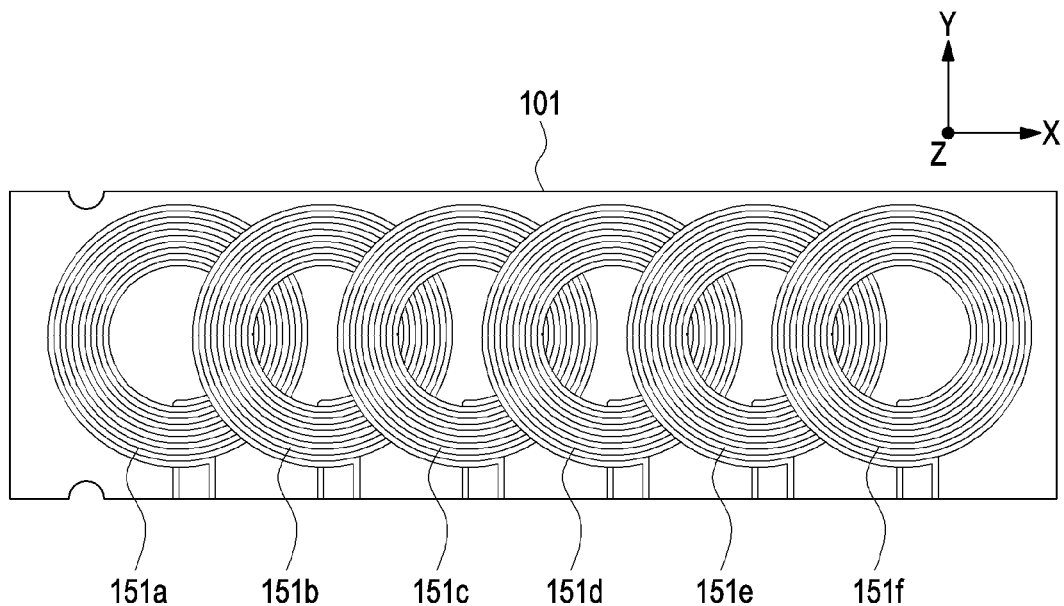
FIG. 2 is a view illustrating a coil arrangement in an electronic device according to various embodiments.

FIG. 2 is a view illustrating a coil arrangement in an electronic device according to various embodiments.

According to various embodiments, the electronic device 101 may include a plurality of coils 151a, 151b, 151c, 151d, 151e, and 151f. Although the plurality of coils 151a, 151b, 151c, 151d, 151e, and 151f are shown as being aligned in one direction along a row (e.g., the x-axis direction) in the embodiment of FIG. 2, the plurality of coils 151a, 151b, 151c, 151d, 151e, and 151f are not limited in alignment direction or arrangement shape. For example, the plurality of coils 151a, 151b, 151c, 151d, 151e, and 151f may be disposed in a plurality of columns in any one direction (e.g., the y-axis direction). In FIG. 2, the plurality of coils 151a, 151b, 151c, 151d, 151e, and 151f are disposed to overlap each other between adjacent coils, but this is also exemplary, but there is no limitation on whether adjacent coils overlap each other. For example, intervals between the plurality of coils 151a, 151b, 151c, 151d, 151e, and 151f may be partially different. As shown in FIG. 2, as the plurality of coils 151a, 151b, 151c, 151d, 151e, and 151f are disposed, the charging area provided by the electronic device 101 may be wider than that of a single coil. In FIG. 2, the plurality of coils 151a, 151b, 151c, 151d, 151e, and 151f are shown as having the same shape, but the shapes of the plurality of coils 151a, 151b, 151c, 151d, 151e, and 151f may be at least partially different. For example, some of the number of turns of the coil, the shape of the coil, the size (e.g., inner diameter or outer diameter) of the coil, and/or the thickness of the coil may be different.

For example, when in-band communication with the wireless power reception device is performed at a target coil, e.g., the third coil 151c, crosstalk may occur between remaining coils (e.g., the second coil 151b and the fourth coil 151d) adjacent to the third coil 151c. According to various embodiments, the electronic device 101 may ground the demodulation path corresponding to the remaining coils (e.g., the first coil 151a, the second coil 151b, the fourth coil 151d, the fifth coil 151e, and the sixth coil 151f) except for the target coil, e.g., the third coil 151c, as described in greater detail below. Accordingly, issues caused by crosstalk between one or more target coils (e.g., the third coil 151c) performing the operation and the remaining adjacent coils (e.g., the second coil 151b and the fourth coil 151d) may be alleviated.

Figure 3:
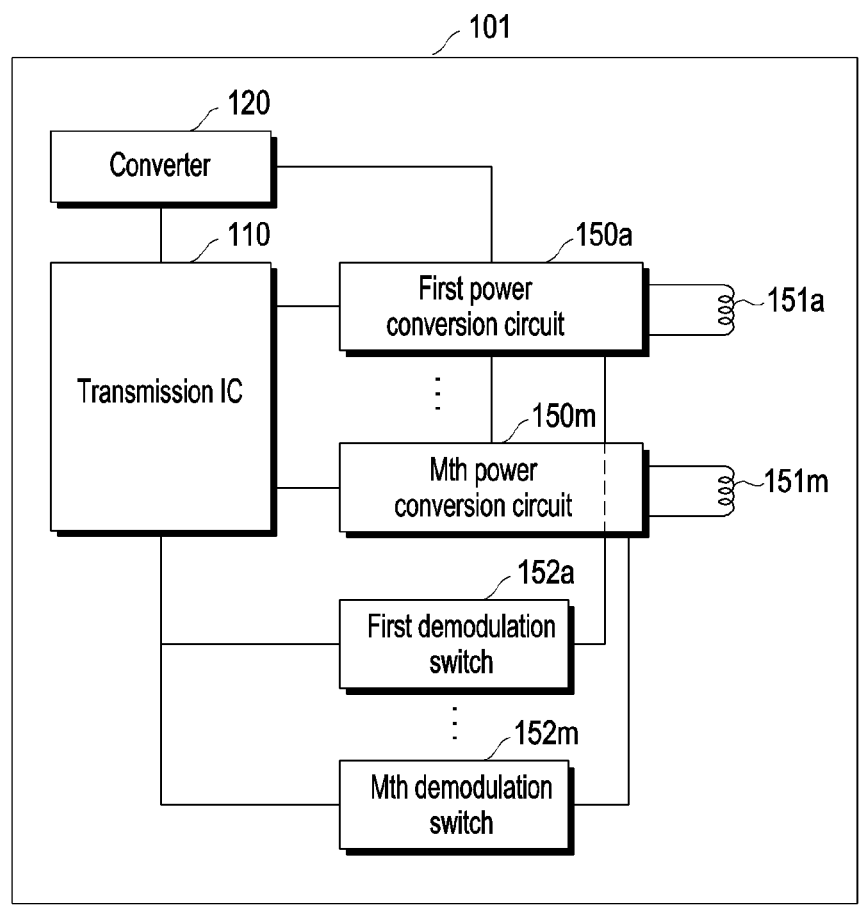
FIG. 3 is a block diagram illustrating an electronic device capable of wirelessly transmitting power according to various embodiments.

FIG. 3 is a block diagram illustrating an electronic device capable of wirelessly transmitting power according to various embodiments.

According to various embodiments, the electronic device 101 may include at least one of a transmission IC 110, a converter 120, a plurality of power conversion circuits 150a, . . . , 150m, a plurality of coils 151a, . . . , 151m, or a plurality of demodulation switches 152a, . . . , 152m.

According to various embodiments, the transmission IC 110 may perform at least one operation for detecting a wireless power reception device (not shown in FIG. 3). The transmission IC 110 may perform at least one operation for identifying information from the wireless power reception device. The transmission IC 110 may perform at least one operation for providing power to the wireless power reception device. The transmission IC 110 may be a controller, for example, capable of performing at least some of the above-described operations and may thus be named as a controller or processor. For example, the transmission IC 110 may be implemented as a dedicated controller configured to perform wireless charging but, in some cases, may be implemented as one, i.e., "integrated" with a main processor (e.g., MCU) that manages the overall operation of the electronic device 101. As another example, the transmission IC 110 may be implemented as a power management integrated circuit (PMIC) that manages the power supplied to the electronic device 101. The transmission IC 110 may be implemented as, e.g., a P9236 model of Renesas/IDT, but this is an example and it will be appreciated by one of ordinary skill in the art that there is no limit as long as it is a controller having the capability of processing at least some of the above-described procedures.

According to various embodiments, the transmission IC 110 may perform at least one operation for detection. For example, the transmission IC 110 may control at least one of the plurality of power conversion circuits 150a, . . . , 150m so that a ping signal is applied to at least one of the plurality of coils 151a, . . . , and 151m. For example, the transmission IC 110 may apply pulses to at least one of the power conversion circuits 150a, . . . , 150m, or may control other hardware to apply pulses. Although only the plurality of coils 151a, . . . , 151m are shown in FIG. 3, one of ordinary skill in the art will understand that at least one capacitor may be further connected to each of the plurality of coils 151a, . . . , and 151m.

In various embodiments, a coil selection switch (not shown in FIG. 3) may be included in each of the plurality of power conversion circuits 150a, . . . , 150m, or which may be disposed between each of the plurality of power conversion circuits 150a, . . . , 150m and the transmission IC 110. According to a non-limiting embodiment, the transmission IC 110 may control the on/off state of the coil selection switch so that a ping signal for detecting a power reception device is applied to a specific coil, as described in greater detail with reference to FIG. 7.

According to a non-limiting embodiment, the plurality of power conversion circuits 150a, . . . , 150m may output AC power according to DC power (e.g., bridge voltage or driving voltage (VDD)) input from the converter 120, and for example, may be named as an inverter. The converter 120 may convert the voltage of DC power from a power source (not shown) and provide the converted voltage to the power conversion circuits 150a, . . . , and 150m.

According to various embodiments, the converter 120 may provide operation power for transmission IC 110. The converter 120 may be implemented as any one of a buck converter, a boost converter, or a buck/boost converter, but is not limited thereto. Each of the power conversion circuits 150a, . . . , 150m may provide AC power corresponding to the ping signal to each of the coils 151a, . . . , 151m. The transmission IC 110 may sequentially control each of the power conversion circuits 150a, . . . , and 150m so that ping signals are sequentially applied to the coils 151a, . . . , and 151m, respectively.

The wireless power reception device may transmit a response by means of a ping signal. More specifically, the wireless power reception device may perform load modulation based on information corresponding to the response. For example, the wireless power reception device may perform load modulation by turning on/off the switch included therein. A load change of the wireless power reception device may be detected by the electronic device 101. For example, the electronic device 101 may sense the voltage and/or current applied to the coil. Although not shown, the electronic device 101 may further include a sensor capable of sensing voltage and/or current applied to the coils 151a, . . . , and 151m. The transmission IC 110 may demodulate the signal, e.g., the sensed voltage and/or current, output from the coil. The transmission IC 110 may identify the information transmitted by the wireless power reception device based on a demodulation result. The transmission IC 110 may detect a wireless power reception device based on a demodulation result after applying the ping signal. The operation in which the wireless power reception device performs load modulation may be referred to as transmitting a communication signal. The operation in which the electronic device 101 performs demodulation and identifies information based on a demodulation result may be referred to as receiving a communication signal. The transmission IC 110 may select the coil where the wireless power reception device is disposed based on whether each of the coils 151a, . . . , 151m responds. Although not shown, the electronic device 101 may further include at least one sensor module for detecting a wireless power reception device. For example, the sensor module may include a proximity sensor, an illuminance sensor, and/or a pressure detection sensor. The electronic device 101 may select at least one coil through the sensor module and apply a ping signal to the selected coil.

According to various embodiments, the wireless power reception device may transmit information (e.g., signal strength packet (SSP)) associated with the magnitude of received power in response or in another step. The transmission IC 110 may select the coil where the wireless power reception device is placed based on information associated with the amount of received power as indicated by the transmit information. For example, when responses are detected from a plurality of coils, the transmission IC 110 may select the coil where a higher SSP has been identified. According to various embodiments, the transmission IC 110 may identify the magnitude (SSP) corresponding to the power (e.g., voltage and/or current) applied to the coil while applying the ping signal. For example, the wireless power reception device may detect the power (voltage and/or current) generated in the coil of the wireless power reception device corresponding to the electromagnetic field output to the wireless power transmission device and generate the modulation signal (SSP) corresponding to the power. The power transmission device may identify the modulation signal (SSP). According to various embodiments, the transmission IC 110 may identify the magnitude corresponding to the power (e.g., voltage and/or current) supplied to the coil to which the ping signal is applied while applying the ping signal. For example, when or while receiving an SSP signal, the voltage/and current applied to the coil (hereinafter referred to as SSP current) may be identified. Meanwhile, one of ordinary skill in the art will understand that the SSP current is merely exemplary term, and any information capable of representing a value including, but not limited to, current, voltage, power, and impedance, applied to the coil upon reception of the SSP signal. As the coil to which the ping signal is applied and the reception coil in the wireless power reception device are better aligned, the magnitude of the current in the coil to which the ping signal is applied tends to decrease. The transmission IC 110 may select the coil having the lowest SSP current identified. The above-described coil selection operation is described below in greater detail.

According to various embodiments, each of the plurality of demodulation switches 152a, . . . , 152m may selectively connect the demodulation path corresponding to each of the coils 151a, . . . , 151m to ground. Here, the demodulation path may refer to the path through which the signal for demodulation is provided to the transmission IC 110. For example, when the first demodulation switch 152a is in an on state, a demodulation path corresponding to the first coil 151a may be connected to ground. That the demodulation path corresponding to the first coil 151a is connected to the ground may mean that the first coil 151a is connected to the ground through at least one intervening element (e.g., sensor). For example, when the first demodulation switch 152a is in an off state, the demodulation path corresponding to the first coil 151a may not be connected to ground (e.g. disconnected), so that the first coil 151*a* may be connected to the transmission IC 110. The transmission IC 110 may control the demodulation switch corresponding to the selected coil in an off state and control the demodulation switch corresponding to the non-selected coil in an on state. For example, when the first coil 151*a* is selected as the coil to be operated, the transmission IC 110 may control the first demodulation switch 152*a* in an off state and control the remaining demodulation switches in an on state. Accordingly, the demodulation path corresponding to the non-selected coil may be grounded, alleviating issues with crosstalk. The transmission IC 110 may demodulate the signal from the selected coil and identify information based on the demodulation result. In FIG. 3, e.g., the first demodulation switch 152*a* is shown as being connected to the first coil 151*a* via the first power conversion circuit 150*a* and the Mth conversion circuit 150*m*, but this is exemplary. The first coil 151*a* and the first demodulation switch 152*a* may be directly connected without an intervening element, or there is no limitation on hardware additionally connected between the first coil 151*a* and the first demodulation switch 152*a*. Further, although it is shown that the driving voltage from the converter 120 to the Mth power conversion circuit 150*m* is provided through the first power conversion circuit 150*a*, this is exemplary. The driving voltage may directly be provided from the converter 120 to the Mth power conversion circuit 150*m*. Meanwhile, it has been described that the demodulation path corresponding to the coil is connected to ground when the demodulation switch is in the on state, and the demodulation path corresponding to the coil is not connected to ground when the demodulation switch is in the off state, but this is merely an example. According to various embodiments, it will be appreciated by one of ordinary skill in the art that such an implementation may be made that the demodulation path corresponding to the coil may be connected to ground when the demodulation switch is in the off state, and the demodulation path corresponding to the coil may not be connected to ground when the demodulation switch is in the on state. In various embodiments, at least some of corresponding coils may be implemented to be grounded/not grounded by the on/off state of the demodulation switch.

Figure 4:
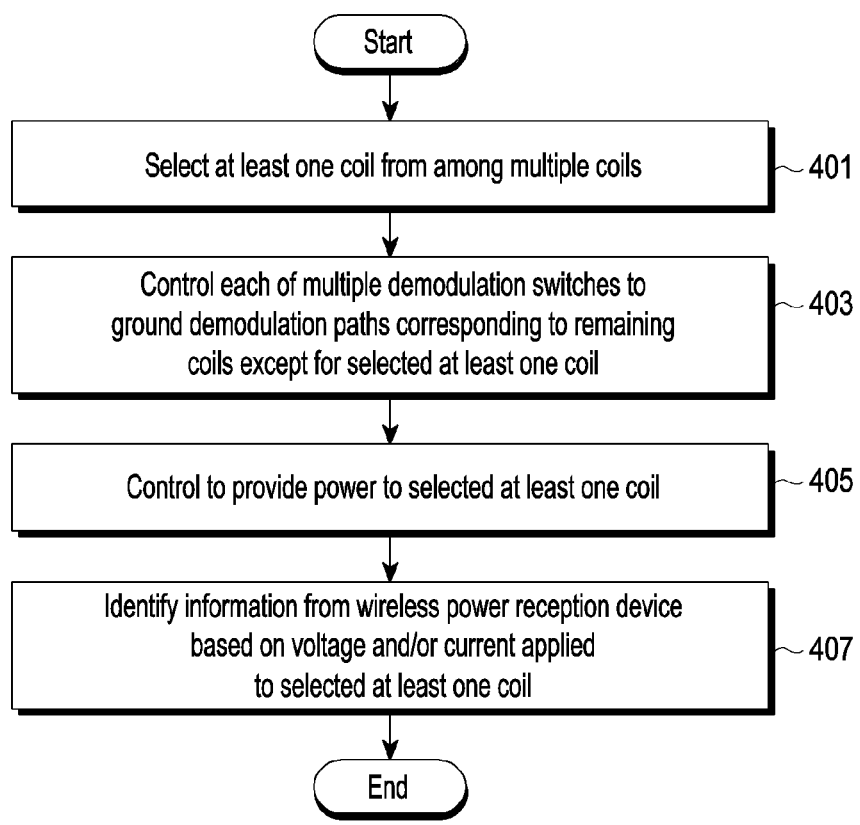
FIG. 4 is a flowchart illustrating an operation method of an electronic device according to various embodiments.

FIG. 4 is a flowchart illustrating an operation method of an electronic device according to various embodiments.

According to various embodiments, the electronic device 101 (e.g., the transmission IC 110) may select at least one of the plurality of coils 151*a*, . . . , 151*m* in operation 401. The electronic device 101 may sequentially apply a ping signal to each of the plurality of coils 151*a*, . . . , 151*m*. For example, the electronic device 101 may apply a ping signal to each of the plurality of coils 151*a*, . . . , 151*m* based on a designated order or pattern. The electronic device 101 may select at least one coil based on at least one of whether to respond to the ping signal, the SSP identified as the demodulation result, or a change in the voltage or current of the coil, but the criteria for selecting the coil are not limited thereto.

According to various embodiments, in operation 403, the electronic device 101 may control each of the plurality of demodulation switches so that the demodulation path corresponding to the coils other than the selected at least one coil are grounded. If the first coil 151*a* is selected, the electronic device 101 may control the first demodulation switch 152*a* corresponding to the first coil 151*a* in an off state and control the remaining demodulation switches corresponding to the other coils than the first coil 151*a* in an on state. Accordingly, the demodulation path corresponding to the first coil 151*a* may not be grounded, and the demodulation path corresponding to the remaining coils may be grounded.

According to various embodiments, the electronic device 101 may control to supply power to at least one selected coil in operation 405. For example, when the first coil 151*a* is selected, the electronic device 101 may control the first power conversion circuit 150*a* to apply power to the first coil 151*a*. As described below in more detail, the coil selection switch included in the first power conversion circuit 150*a* or selectively connecting the first power conversion circuit 150*a* to the transmission IC 110 may be controlled in an on state.

In operation 407, the electronic device 101 may identify information from the wireless power reception device based on the voltage and/or current applied to at least one selected coil. For example, since the demodulation path corresponding to the remaining coils other than the first coil 151*a* are grounded, crosstalk between the first coil 151*a* and the remaining coils may be prevented. The electronic device 101 may demodulate the signal of the first coil 151*a*, that is, the voltage and/or current applied to the first coil 151*a*. The electronic device 101 may identify information from the wireless power reception device based on the demodulation result. For example, the information may include at least one of a device ID and an SSP, but the type is not limited. The electronic device 101 may control power transmission based on the signal received from the wireless power reception device based on a demodulation result. For example, the electronic device 101 may increase or decrease transmission power or stop power transmission based on the demodulation result.

Figure 5:
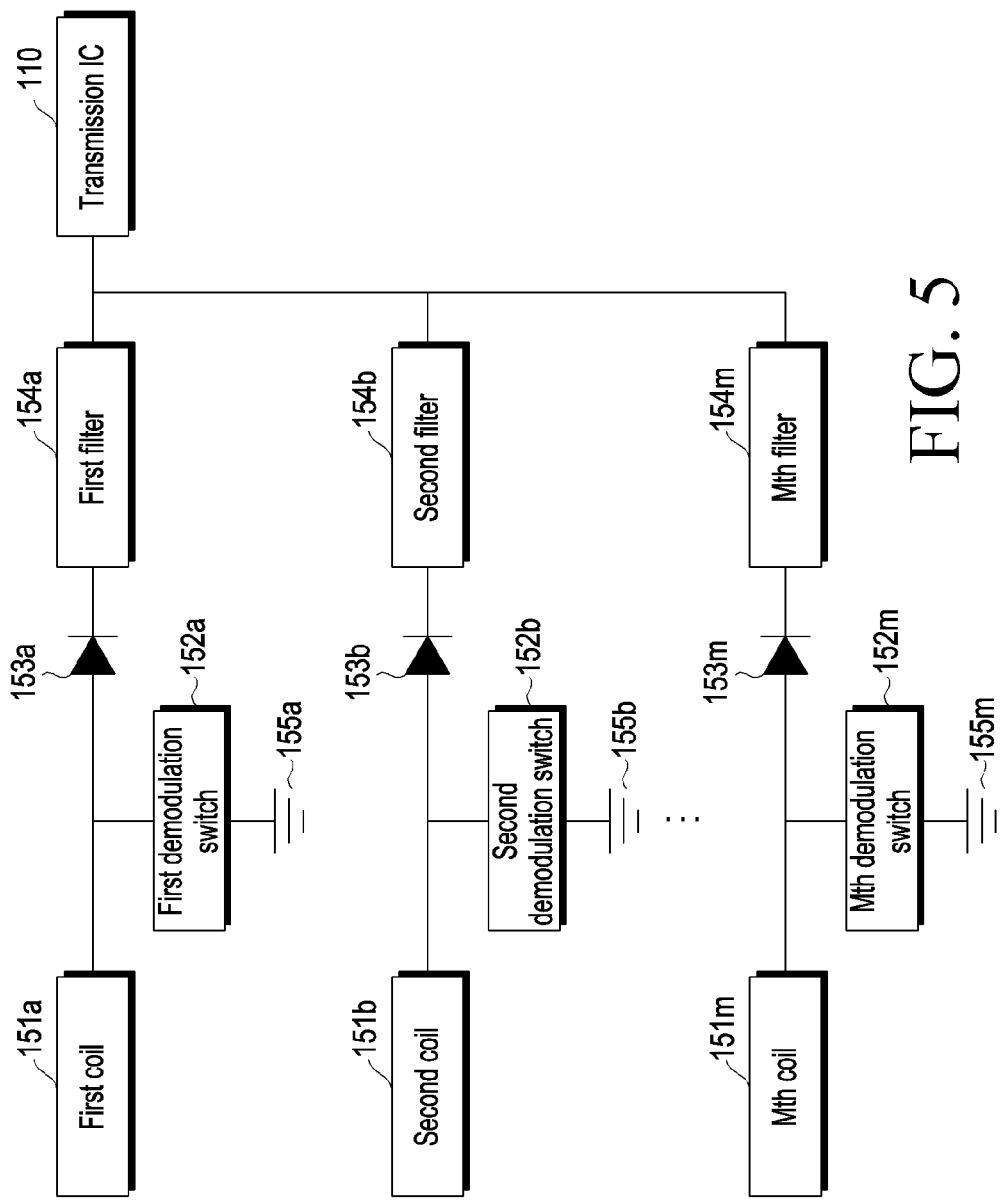
FIG. 5 is a view illustrating an operation of grounding a demodulation path corresponding to a coil according to various embodiments.

FIG. 5 is a view illustrating an operation of grounding a demodulation path corresponding to a coil according to various embodiments.

According to various embodiments, a first rectifier 153*a* and a first demodulation switch 152*a* may be connected to the first coil 151*a*. As described above, at least one capacitor may be further connected to the first coil 151*a*. The first demodulation switch 152*a* may selectively connect a demodulation path corresponding to the first ground 155*a* and the first coil 151*a*. When the first demodulation switch 152*a* is in an on state, the demodulation path corresponding to the first coil 151*a* and the first ground 155*a* may be connected, which in turn establishes an electrically conductive path to ground. In this case, the signal from the first coil 151*a* may be applied to the first ground 155*a*, and no signal may be transferred to the first rectifier 153*a*. Although the first ground 155*a* is shown as being connected from before the input end of the first rectifier 153*a*, this is exemplary and, in other implementations, the first demodulation switch 152*a* and the first ground 155*a* may be connected from after the output end of the rectifier 153*a*.

When the first demodulation switch 152*a* is in an off state, the demodulation path corresponding to the first coil 151*a* and the first ground 155*a* may not be connected. In this case, the signal from the first coil 151*a* may be provided to the first rectifier 153*a*. According to various embodiments, the first rectifier 153*a* may rectify an input signal. The first filter 154*a* may pass a designated frequency band of the input rectified signal and transfer it to the transmission IC 110. While passing through the first filter 154*a*, noise of a frequency other than the frequency corresponding to modulation and demodulation of in-band communication may be filtered. The transmission IC 110 may demodulate the filtered signal and identify information from the power reception device based on the demodulation result.

The above descriptions of the first coil 151a, the first demodulation switch 152a, the first rectifier 153a, the first filter 154a, and the first ground 155a may be equally applied to the second coil 151b, the second demodulation switch 152b, the second rectifier 153b, the second filter 154b, and the second ground 155b and to the Mth coil 151m, the Mth demodulation switch 152m, the Mth rectifier 153m, the Mth filter 154m, and the Mth ground 155m. In various embodiments, the first rectifier 153a to the Mth rectifier 153m may be implemented as one rectifier or as different pieces of hardware. In various embodiments, the first filter 154a to the Mth filter 154m may be implemented as one filter or as different pieces of hardware. In various embodiments, the first ground 155a to the Mth ground 155m may be implemented as a common ground or as different grounds.

According to various embodiments, the transmission IC 110 may select any one of the first coil 151a to the Mth coil 151m as a coil for operation. The transmission IC 110 may control the demodulation switch corresponding to the selected coil in an off state and control the demodulation switches corresponding to the remaining coils in an on state. Accordingly, as signals from non-selected coils are transferred (e.g., shunted) to the ground, issues with crosstalk in the transmission IC 110 may be alleviated.

Figure 6:
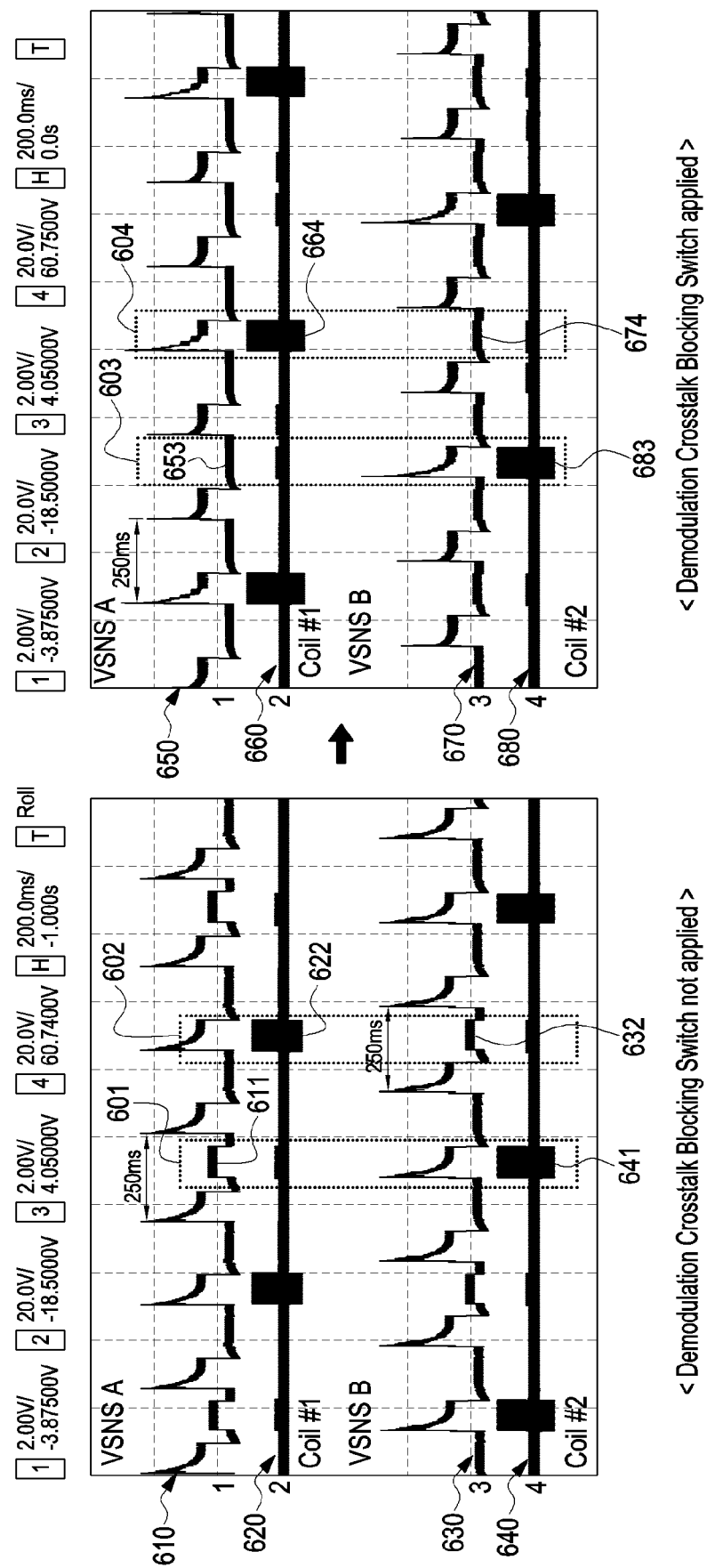
FIG. 6 illustrates a measurement waveform of a voltage according to whether various embodiments apply.

FIG. 6 illustrates a measurement waveform of a voltage according to whether various embodiments apply.

According to various embodiments, the electronic device 101 may include a first coil Coil #1 and a second coil Coil #2. The first coil Coil #1 and the second coil Coil #2 may be adjacent to each other, for example. The first example is an example for comparison with the embodiment. The electronic device 101 does not control the demodulation switch corresponding to the first coil Coil #1 and the demodulation switch corresponding to the second coil Coil #2 so that the demodulation switches may be kept in an off state. In the first example, the first waveform 610 may be a voltage sensed from the first coil Coil #1. In the first example, the second waveform 620 is a voltage applied to the first coil Coil #1 and may include, e.g., a ping signal 622. In the first example, the third waveform 630 may be a voltage sensed from the second coil Coil #2. In the first example, the fourth waveform 640 is a voltage applied to the second coil Coil #2 and may include, e.g., a ping signal 641. During the first period 601, the ping signal 641 may be applied to the second coil Coil #2. Due to the crosstalk, the voltage 611 sensed from the first coil Coil #1 during the first period 601 may be changed. During the second period 602, the ping signal 622 may be applied to the first coil Coil #1. Due to the crosstalk, the voltage 642 sensed from the second coil Coil #2 during the second period 602 may be changed.

The second example is an example in which the demodulation switch is manipulated according to the embodiment. In the second example, the fifth waveform 650 may be a voltage sensed from the first coil Coil #1. In the second example, the sixth waveform 660 is a voltage applied to the first coil Coil #1 and may include, e.g., a ping signal 664. In the second example, the seventh waveform 670 may be a voltage sensed from the second coil Coil #2. In the second example, the eighth waveform 680 is a voltage applied to the second coil Coil #2 and may include, e.g., a ping signal 683. For example, when the ping signal 683 is applied to the second coil Coil #2 during the third period 603, the demodulation switch corresponding to the second coil Coil #2 may be controlled in an off state, and the demodulation switch corresponding to the first coil Coil #1 may be controlled in an on state. The demodulation path corresponding to the first coil Coil #1 may be grounded. Accordingly, the voltage 653 sensed from the first coil Coil #1 may not be affected by the ping signal 683. For example, when the ping signal 664 is applied to the first coil Coil #1 during the fourth period 604, the demodulation switch corresponding to the first coil Coil #1 may be controlled in an off state, and the demodulation switch corresponding to the second coil Coil #2 may be controlled in an on state. The demodulation path corresponding to the second coil Coil #2 may be grounded. Accordingly, the voltage 674 sensed from the second coil Coil #2 may not be affected by the ping signal 664.

Figure 7:
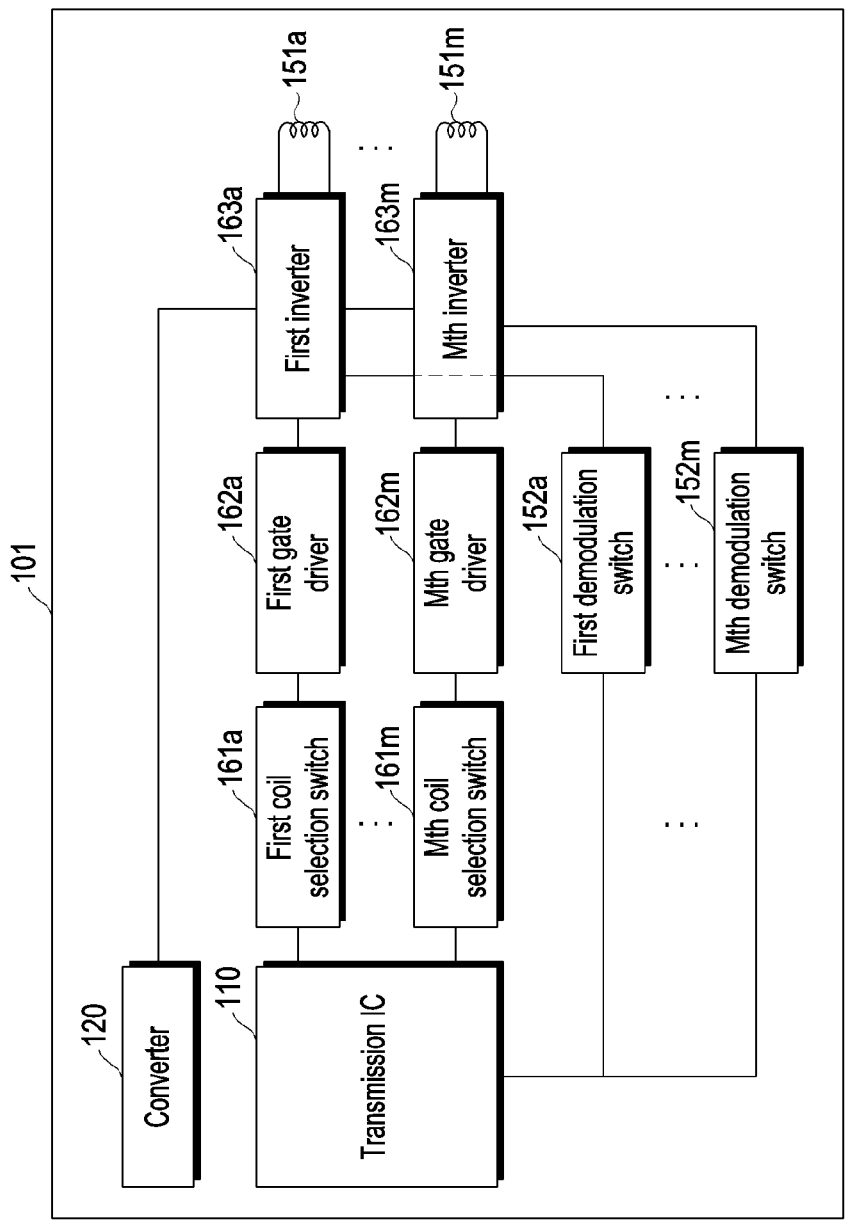
FIG. 7 is a block diagram illustrating an electronic device capable of wirelessly transmitting power according to various embodiments.

FIG. 7 is a block diagram illustrating an electronic device capable of wirelessly transmitting power according to various embodiments.

According to various embodiments, the electronic device 101 may include at least one of a transmission IC 110, a converter 120, a plurality of coil selection switches 161a, ..., 161m, a plurality of gate drivers 162a, ..., 162m, a plurality of inverters 163a, ..., 163m, a plurality of coils 151a, ..., 151m, or a plurality of demodulation switches 152a, ..., 152m. For example, at least two or more of the first coil selection switch 161a, the first gate driver 162a, and the first inverter 163a may be implemented as a single piece of hardware or may all be implemented as independent pieces of hardware.

According to various embodiments, the plurality of coil selection switches 161a, ..., 161m may selectively connect the transmission IC 110 to the plurality of gate drivers 162a, ..., 162m, respectively. The on/off state of each of the plurality of coil selection switches 161a, ..., 161m may be controlled by the transmission IC 110. According to a non-limiting embodiment, the coil selection switches 161a, ..., 161m may be implemented as, e.g., level shifters or back-to-back switches. It should be appreciated, however that the coil selection switch is not limited level shifters or back-to-back switches, and that other types of switches can be implemented. According to various embodiments, when a coil to perform an operation is selected, the transmission IC 110 may control the corresponding coil selection switch in an on state so that the selected coil is connected. For example, if it is determined to perform an operation on the first coil 151a (e.g., applying a ping signal to the first coil 151a, or applying charging power to the first coil 151a), the transmission IC 110 may control the first coil selection switch 161a corresponding to the first coil 151a in an on state. The transmission IC 110 may control the remaining coil selection switches in an off state.

Each of the plurality of gate drivers 162a, ..., 162m may apply a driving signal to the gate of the transistor included in each of the plurality of inverters 163a, ..., 163m using the received signal. The driving signal may be, e.g., in the form of a pulse width modulation (PWM) pulse. The inverters 163a, ..., 163m may output AC power using the driving voltage (or bridge voltage) from the converter 120 and the driving signal input from each of the gate drivers 162a, ..., 162m, For example, when the first coil selection switch 161a is controlled in an on state, the pulse output from the transmission IC 110 may be provided to the first gate driver 162a. The first gate driver 162a may apply a driving signal to the gate of the transistor of the first inverter 163a based on the received pulse. The first inverter 163a may apply AC power to the first coil 151a according to the driving signal and the driving voltage.

Meanwhile, the transmission IC 110 may control the demodulation switch corresponding to the selected coil in an off state and control the demodulation switch corresponding to the non-selected coil in an on state. For example, when the first coil 151a is selected, the first demodulation switch 152a corresponding to the first coil 151*a* may be controlled in an off state, and the remaining demodulation switches may be controlled in an on state. The state of the coil selection switch corresponding to the selected coil and the state of the demodulation switch corresponding to the selected coil may be opposite. Further, the state of the coil selection switch corresponding to the non-selected coil and the state of the demodulation switch corresponding to the non-selected coil may be opposite.

Figure 8A:
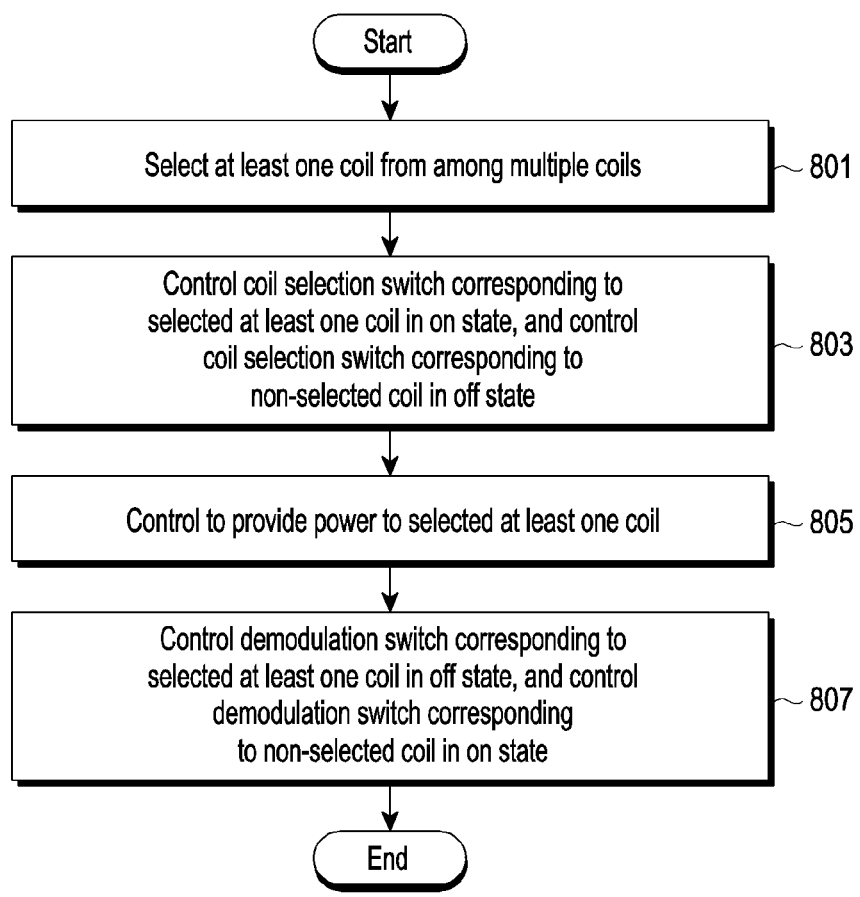
FIG. 8A is a flowchart illustrating an operation method of an electronic device according to various embodiments.

FIG. 8A is a flowchart illustrating an operation method of an electronic device according to various embodiments.

At operation 801, for example, the electronic device 101 (e.g., the transmission IC 110) may select at least one of the plurality of coils 151*a*, . . . , 151*m* in operation 401. The electronic device 101 may sequentially apply a ping signal to each of the plurality of coils 151*a*, . . . , 151*m*. For example, the electronic device 101 may apply a ping signal to each of the plurality of coils 151*a*, . . . , 151*m* based on a designated order or pattern. The electronic device 101 may select at least one coil for power transmission based on at least one of whether to respond to the ping signal, the SSP identified as the demodulation result, or the SSP current, but the criteria for selecting the coil are not limited thereto.

According to various embodiments, in operation 803, the electronic device 101 may control the coil selection switch corresponding to at least one selected coil in an on state and control the coil selection switch corresponding to the non-selected coil in an off state. In operation 805, the electronic device 101 may control to provide power to at least one selected coil. As the coil selection switch is controlled in an on state, power may be transferred to the coil through the coil selection switch. In operation 807, the electronic device 101 may control the demodulation switch corresponding to the at least one selected coil in an off state and control the demodulation switch corresponding to the non-selected coil in an on state. Accordingly, the demodulation path corresponding to the remaining coils other than the selected at least one coil may be grounded. The electronic device 101 may demodulate the signal from the selected coil and identify information from the wireless power reception device based on the demodulation result.

Meanwhile, although it has been described that the transmission IC 110 is connected to the gate driver when the coil selection switch is in an on state, and the transmission IC 110 is not connected to the gate driver when the coil selection switch is in the off state, this is merely an example. According to various embodiments, it will be appreciated by one of ordinary skill in the art that that in an implementation, the transmission IC 110 is connected to the gate driver when the coil selection switch is in an off state, and the transmission IC 110 is not connected to the gate driver when the coil selection switch is in an on state.

Figure 8B:
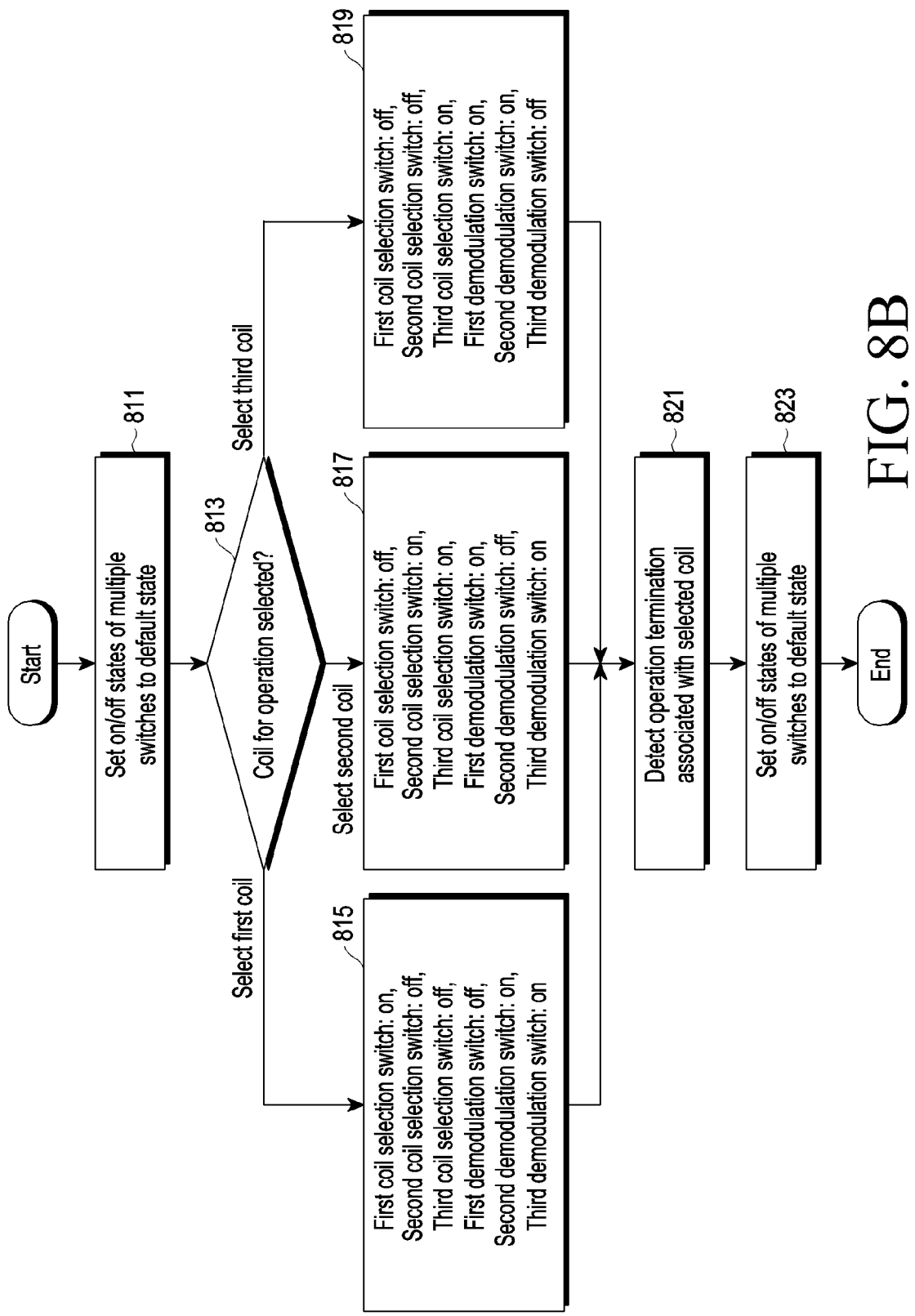
FIG. 8B is a flowchart illustrating an operation method of an electronic device according to various embodiments.

FIG. 8B is a flowchart illustrating an operation method of an electronic device according to various embodiments.

According to various embodiments, in operation 811, the electronic device 101 (e.g., the transmission IC 110) may set the on/off states of a plurality of switches to a default state. For example, all of the coil selection switches (e.g., the plurality of coil selection switches 161*a*, . . . , 161*m* of FIG. 7) may be controlled in an off state as the default state, and all of the demodulation switches (e.g., the plurality of demodulation switches 152*a*, . . . , 152*m* of FIG. 7) may be controlled in an on state as the default state, but are not limited thereto. In operation 813, the electronic device 101 may select a coil for operation. For example, in the embodiment of FIG. 8B, it is assumed that three coils are connected to the electronic device 101, e.g., the transmission IC 110.

When the first coil is selected in operation 813, the electronic device 101 may, in operation 815, control the first coil selection switch corresponding to the first coil in an on state, control the second coil selection switch corresponding to the second coil in an off state, and control the third coil selection switch corresponding to the third coil in an off state. When the first coil is selected in operation 813, the electronic device 101 may control the first demodulation switch corresponding to the first coil in an off state, control the second demodulation switch corresponding to the second coil in an on state, and control the third demodulation switch corresponding to the third coil in an on state. When the second coil is selected in operation 813, the electronic device 101 may, in operation 817, control the first coil selection switch in an off state, control the second coil selection switch in an on state, and control the third coil selection switch in an off state. When the second coil is selected in operation 813, the electronic device 101 may control the first demodulation switch in an on state, control the second demodulation switch in an off state, and control the third demodulation switch in an on state. When the third coil is selected in operation 813, the electronic device 101 may, in operation 819, control the first coil selection switch in an off state, control the second coil selection switch in an off state, and control the third coil selection switch in an on state. When the third coil is selected in operation 813, the electronic device 101 may control the first demodulation switch in an on state, control the second demodulation switch in an on state, and control the third demodulation switch in an off state.

In operation 821, the electronic device 101 may detect termination of the operation associated with the selected coil. In operation 823, the electronic device 101 may set the on/off states of the plurality of switches to the default state. If another coil is directly selected, the electronic device 101 may skip the execution of operation 823 and may immediately control the on/off state of the plurality of switches (e.g., coil selection switches and/or demodulation switches) to correspond to the newly selected coil.

Figure 9:
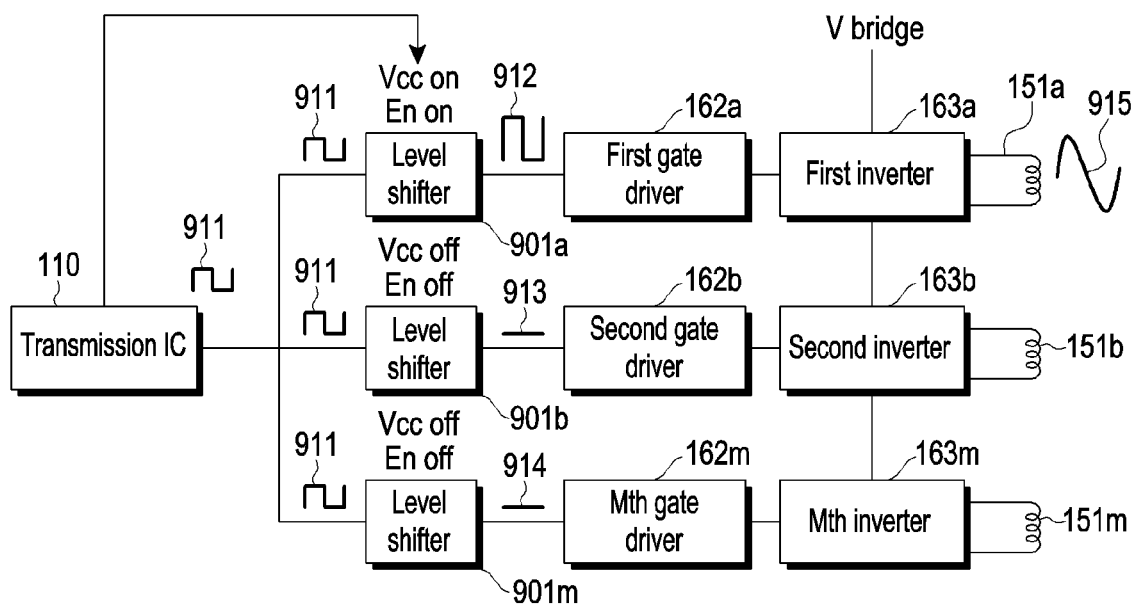
FIG. 9 is a view illustrating a coil selection switch of an electronic device according to various embodiments.

FIG. 9 is a view illustrating a coil selection switch of an electronic device according to various embodiments.

According to various embodiments, the transmission IC 110 may be connected to a plurality of level shifters 901*a*, 901*b*, and 901*m*. FIG. 9 illustrates that one output path of the transmission IC 110 is branched to each of the level shifters 901*a*, 901*b*, and 901*m*, but this is exemplary, and three outputs from the transmission IC 110 may be connected to the level shifters 901*a*, 901*b*, and 901*m*, respectively.

The plurality of level shifters 901*a*, 901*b*, and 901*m* may be connected to gate drivers 162*a*, 162*b*, and 162*m*. The transmission IC 110 may output a pulse 911. The pulse 911 may be input to the plurality of level shifters 901*a*, 901*b*, and 901*m*. The transmission IC 110 may selectively provide a driving voltage Vcc and/or an enable signal En to each of the plurality of level shifters 901*a*, 901*b*, and 901*m*. The driving voltage Vcc may be provided from a converter (e.g., the converter 120 of FIG. 7). The transmission IC 110 may selectively provide the driving voltage Vcc and/or the enable signal En based on a general purpose input/output (GPIO) interface. The GPIO is merely an example, and signals may be provided through an interface, such as a serial peripheral interface (SPI) or a mobile industry processor interface (MIPI).

For example, when the first coil 151*a* is selected as the coil to be operated, the transmission IC 110 may provide the driving voltage Vcc and the enable signal En to the first level shifter 901*a*. The driving voltage Vcc may be provided from the converter 120 (not shown in FIG. 9) as described above. The first level shifter 901*a* may change the level of the input pulse 911 and output the changed pulse 912. For example, when the first level shifter 901*a* receives a pulse 911 having a level of 3.3V, it may output a pulse 912 having a level of 5V. When the first coil 151*a* is selected as the coil to be operated, the transmission IC 110 may control not to apply the driving voltage Vcc to the second level shifter 901*b* or control not to apply the enable signal En. When the first coil 151*a* is selected as the coil to be operated, the transmission IC 110 may operate to not apply the driving voltage Vcc to the third level shifter 901*m* or operate to not apply the enable signal En. Accordingly, the output voltage 913 from the second level shifter 901*b* and the output voltage 914 from the third level shifter 901*m* may be substantially zero.

The first gate driver 162*a* may receive the level-changed pulse 912. The first gate driver 162*a* may apply a driving signal to the gate of the transistor of the first inverter 163*a* using the pulse 912. The first inverter 163*a* may output AC power 915 using the driving signal applied to the gate of the transistor and the DC voltage (Vbridge) input from the converter 120. For example, the first inverter 163*a* may output power based on the DC voltage (Vbridge) while the driving signal applied to the gate of the transistor is on duration. For example, the first inverter 163*a* may not output power based on the DC voltage (Vbridge) while the driving signal applied to the gate of the transistor is off duration. Accordingly, AC power 915 may be applied to the first coil 151*a*.

Meanwhile, since the output voltage 913 from the second level shifter 901*b* and the output voltage 914 from the third level shifter 901*m* are substantially 0, the gate drivers 162*b* and 162*m* may not operate so that AC power may not be provided to the second coil 151*b* and the mth coil 151*m*. For example, the gate may be grounded and, as all of the power conversion circuits (e.g., gate drivers and/or inverters) are connected to ground, interference may be reduced.

As described above, whether AC power is provided to the coil may be determined depending on whether signals are output from the level shifters 901*a*, 901*b*, and 901*m*. Since the level shifters 901*a*, 901*b*, and 901*m* may be controlled by the on/off scheme of the DC power, isolation between the level shifters 901*a*, 901*b*, and 901*m* is possible, and the AC switch may be prevented from application of a high internal pressure.

Further, the switch for providing power to the selected coil may be included not only in an electronic device 101 using in-band communication as shown in FIG. 3 or 7 but also in an electronic device (e.g., an electronic device according to the AFA standard) using out-of-band communication.

Figure 10A:
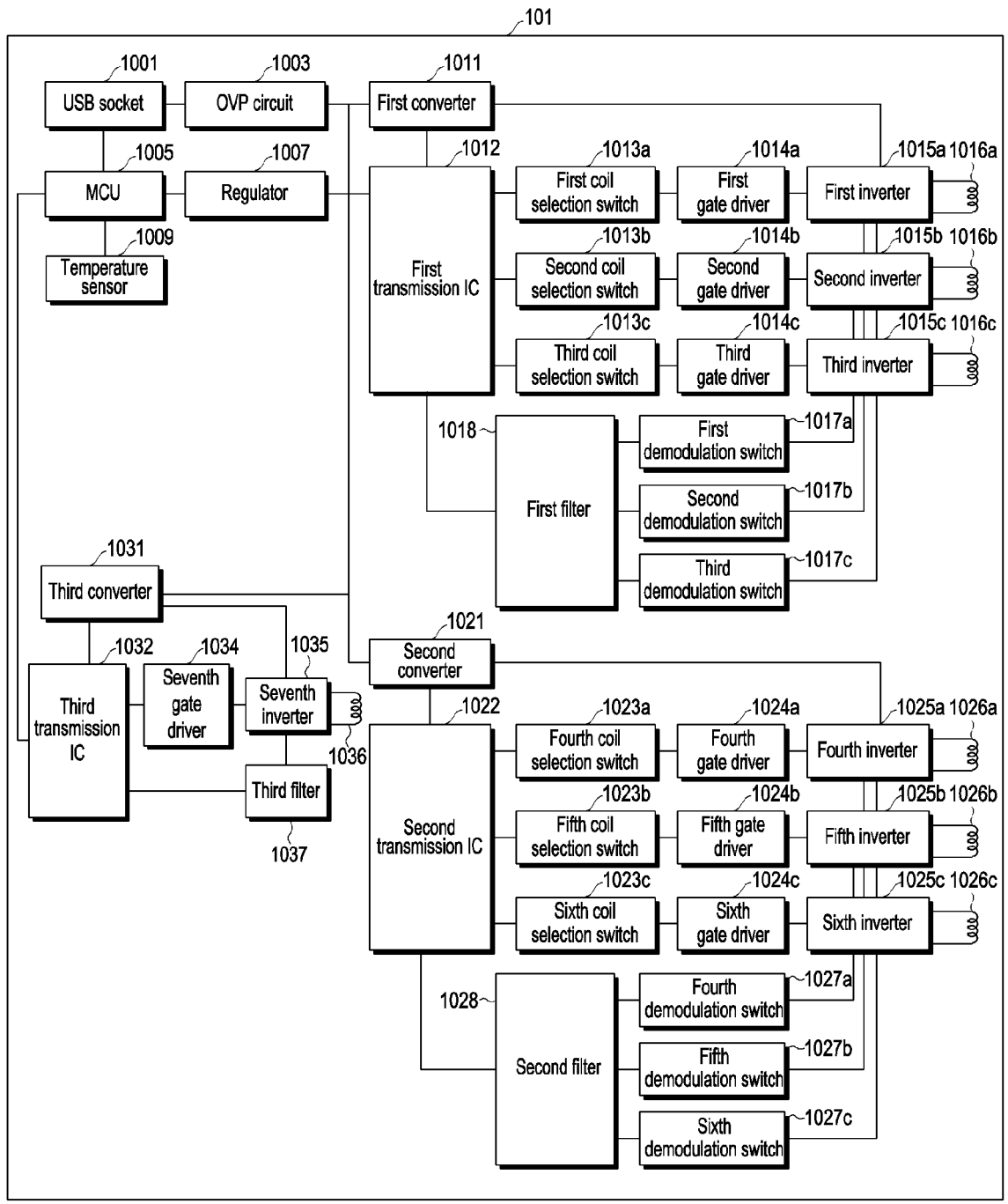
FIG. 10A is a block diagram illustrating an electronic device according to various embodiments.
Figure 10B:
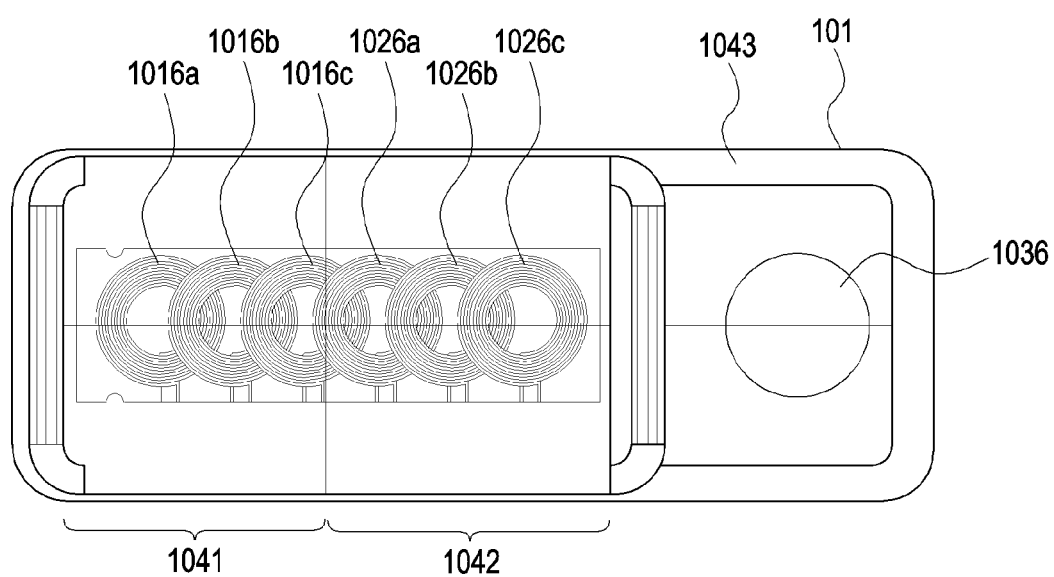
FIG. 10B is a concept view illustrating an electronic device according to various embodiments.

FIG. 10A is a block diagram illustrating an electronic device according to various non-limiting embodiments. The embodiment of FIG. 10A is described with reference to FIG. 10B. As described herein, FIG. 10B is a concept view illustrating an electronic device according to various non-limiting embodiments.

According to a non-limiting embodiment, the electronic device 101 may include a first transmission IC 1012, a second transmission IC 1022, and a third transmission IC 1032. The first transmission IC 1012 may provide a signal (e.g., a ping signal or a signal for charging) to the first coil 1016*a*, the second coil 1016*b*, and the third coil 1016*c*. The first transmission IC 1012 may demodulate signals output from the first coil 1016*a*, the second coil 1016*b*, and the third coil 1016*c* and identify information from the wireless power reception device based on the demodulation result. For example, as shown in FIG. 10B, the first coil 1016*a*, the second coil 1016*b*, and the third coil 1016*c* may be disposed to cover the first area 1041 of the electronic device 101. The second transmission IC 1022 may provide a signal (e.g., a ping signal or a signal for charging) to the fourth coil 1026*a*, the fifth coil 1026*b*, and the sixth coil 1026*c*. The second transmission IC 1022 may demodulate signals output from the fourth coil 1026*a*, the fifth coil 1026*b*, and the sixth coil 1026*c* and identify information from the wireless power reception device based on the demodulation result. For example, as shown in FIG. 10B, the fourth coil 1026*a*, the fifth coil 1026*b*, and the sixth coil 1026*c* may be disposed to cover the second area 1042 of the electronic device 101. The third transmission IC 1032 may provide a signal (e.g., a ping signal or a signal for charging) to the seventh coil 1036. The third transmission IC 1032 may demodulate the signal output from the seventh coil 1036 and identify information from the wireless power reception device based on the demodulation result. For example, as shown in FIG. 10B, the seventh coil 1036 may be disposed to cover the third area 1043 of the electronic device 101. Meanwhile, it is merely exemplary that the electronic device 101 has three areas 1041, 1042, and 1043 and/or seven coils 1016*a*, 1016*b*, 1016*c*, 1026*a*, 1026*b*, 1026*c*, and 1036, and there is no limitation on the areas and/or the number, position, size or shape of the coils.

According to various embodiments, the first coil selection switch 1013*a*, the second coil selection switch 1013*b*, and the third coil selection switch 1013*c* may selectively connect the first transmission IC 1012 to the first gate driver 1014*a*, the second gate driver 1014*b*, and the third gate driver 1014*c*, respectively. Each of the first coil selection switch 1013*a*, the second coil selection switch 1013*b*, and the third coil selection switch 1013*c* may be implemented as, e.g., a level shifter, but the implementation form is not limited. The on/off state of each of the first coil selection switch 1013*a*, the second coil selection switch 1013*b*, and the third coil selection switch 1013*c* may be controlled by the first transmission IC 1012. The first gate driver 1014*a*, the second gate driver 1014*b*, and the third gate driver 1014*c* may apply driving signals to the gates of the first inverter 1015*a*, the second inverter 1015*b*, and the third inverter 1015*c*, respectively, using the pulse received from the transmission IC 1012 (or the pulse whose level has been changed by the level shifter). Each of the first inverter 1015*a*, the second inverter 1015*b*, and the third inverter 1015*c* may provide AC power to the first coil 1016*a*, the second coil 1016*b*, and the third coil 1016*c*, respectively, using the driving voltage from the first converter 1011 and the driving signals received from the gate drivers 1014*a*, 1014*b*, and 1014*c*.

According to various embodiments, the first demodulation switch 1017*a*, the second demodulation switch 1017*b*, and the third demodulation switch 1017*c* may selectively ground the first inverter 1015*a*, the second inverter 1015*b*, and the third inverter 1015*c*, respectively. For example, when each of the first demodulation switch 1017*a*, the second demodulation switch 1017*b*, and the third demodulation switch 1017*c* is in an on state, the first inverter 1015*a*, the second inverter 1015*b*, and the third inverters 1015*c* may be connected to ground. For example, when each of the first demodulation switch 1017*a*, the second demodulation switch 1017*b*, and the third demodulation switch 1017*c* is in an off state, the first inverter 1015*a*, the second inverter 1015*b*, and the third inverter 1015*c* each may not be connected to ground. The first filter 1018 may pass a designated frequency band of the input signal (e.g., a rectified signal) and transfer the signal to the first transmission IC 1012. The first filter 1018 may pass a designated frequency band of the signal input from a demodulation switch, which is in an off state, among the first demodulation switch 1017a, the second demodulation switch 1017b, and the third demodulation switch 1017c and transfer it to the first transmission IC 1012. As the first filter 1018, a single first filter may be configured and connected to a plurality of demodulation switches or a plurality of first filters 1018 may be configured and connected to a plurality of demodulation switches, respectively. The first transmission IC 1012 may demodulate the filtered signal and identify information based on the demodulation result.

According to various embodiments, the fourth coil selection switch 1023a, the fifth coil selection switch 1023b, and the sixth coil selection switch 1023c may selectively connect the second transmission IC 1022 to the fourth gate driver 1024a, the fifth gate driver 1024b, and the sixth gate driver 1024c, respectively. Each of the fourth coil selection switch 1023a, the fifth coil selection switch 1023b, and the sixth coil selection switch 1023c may be implemented as, e.g., a level shifter, but the implementation form is not limited. The on/off state of each of the fourth coil selection switch 1023a, the fifth coil selection switch 1023b, and the sixth coil selection switch 1023c may be controlled by the second transmission IC 1022. The fourth gate driver 1024a, the fifth gate driver 1024b, and the sixth gate driver 1024c may apply driving signals to the gates of the fourth inverter 1025a, the fifth inverter 1025b, and the sixth inverter 1025c, respectively, using the pulse received from the second transmission IC 1022 (or the pulse whose level has been changed by the level shifter). Each of the fourth inverter 1025a, the fifth inverter 1025b, and the sixth inverter 1025c may provide AC power to the fourth coil 1026a, the fifth coil 1026b, and the sixth coil 1026c, respectively, using the driving voltage from the second converter 1021 and the driving signals received from the gate drivers 1024a, 1024b, and 1024c.

According to various embodiments, the fourth demodulation switch 1027a, the fifth demodulation switch 1027b, and the sixth demodulation switch 1027c may selectively ground the fourth inverter 1025a, the fifth inverter 1025b, and the sixth inverter 1025c, respectively. For example, when each of the fourth demodulation switch 1027a, the fifth demodulation switch 1027b, and the sixth demodulation switch 1027c is in an on state, the fourth inverter 1025a, the fifth inverter 1025b, and the sixth inverters 1025c may be connected to ground. For example, when each of the fourth demodulation switch 1027a, the fifth demodulation switch 1027b, and the sixth demodulation switch 1027c is in an off state, the fourth inverter 1025a, the fifth inverter 1025b, and the sixth inverter 1025c each may not be connected to ground. The second filter 1028 may pass a designated frequency band of the input signal (e.g., a rectified signal) and transfer the signal to the second transmission IC 1022. The second filter 1028 may pass a designated frequency band of the signal input from a demodulation switch, which is in an off state, among the fourth demodulation switch 1027a, the fifth demodulation switch 1027b, and the sixth demodulation switch 1027c and transfer it to the second transmission IC 1022. As the second filter 1028, a single second filter may be configured and connected to a plurality of demodulation switches or a plurality of second filters 1028 may be configured and connected to a plurality of demodulation switches, respectively. The second transmission IC 1022 may demodulate the filtered signal and identify information based on the demodulation result.

According to various embodiments, the seventh gate driver 1034 may apply the driving signal to the gate of the transistor of the seventh inverter 1035 using the pulse received from the third transmission IC 1032 (or the pulse whose level has been changed by the level shifter). The seventh inverter 1035 may provide AC power to the seventh coil 1036 based on the driving signal received from the seventh gate driver 1034 and the driving voltage from the third converter 1031. Meanwhile, as in FIG. 10A, the number of three transmission ICs 1012, 1022, and 1032 is merely exemplary but is not limited.

According to various embodiments, the MCU 1005 may transmit/receive data to/from the transmission ICs 1012, 1022, and 1032. The MCU 1005 may receive data from the transmission ICs 1012, 1022, and 1032 and may transmit data for controlling the transmission ICs 1012, 1022, and 1032. As described above, the first transmission IC 1012 may select any one of the first coil 1016a, the second coil 1016b, and the third coil 1016c and apply power (e.g., a ping signal) to the selected coil. Further, the second transmission IC 1022 may select any one of the fourth coil 1026a, the fifth coil 1026b, and the sixth coil 1026c and apply power (e.g., a ping signal) to the selected coil. However, the ping signal needs to be controlled not to be simultaneously applied to the plurality of coils. The MCU 1005 may transmit a control command to output a ping signal to the plurality of transmission ICs 1012, 1022, and 1032 and thus be controlled not to simultaneously apply ping signals to the plurality of coils. The MCU 1005 is not limited as long as it is hardware capable of calculation, and may be referred to as a processor.

According to various embodiments, the USB socket 1001 may be a socket into which a USB-type connecting terminal may be inserted. One of ordinary skill in the art will understand that the USB socket 1001 may be replaced if it is an interface that may receive power from the outside. The over-voltage protection (OVP) circuit 1003 may perform an operation to protect hardware within the electronic device 101 when an overvoltage is applied from the outside. The regulator 1007 may be, e.g., a low drop output (LDO) regulator. The temperature sensor 1009 may measure the temperature of at least one point within the electronic device 101 and, based on the temperature, the MCU 1005 may also perform an over temperature protection operation.

Figure 11A:
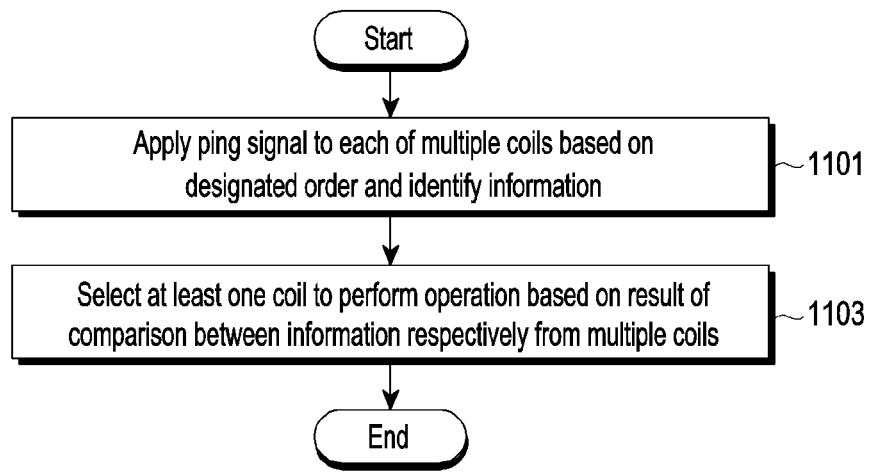
FIG. 11A is a flowchart illustrating an operation method of an electronic device according to various embodiments.

FIG. 11A is a flowchart illustrating an operation method of an electronic device according to various embodiments.

According to various embodiments, in operation 1101, the electronic device 101 (e.g., the MCU 1005 and at least one of the plurality of transmission ICs 1012, 1022, and 1032) may perform ping signal application and information identification on each of the plurality of coils based on a designated order. For example, the electronic device 101 may control to apply a ping signal to each of the plurality of coils 1016a, 1016b, 1016c, 1026a, 1026b, 1026c, and 1036, sequentially or in a designated pattern. In one example, the electronic device 101 may control the first transmission IC 1012 to apply a ping signal to the first coil 1016a and may control the second transmission IC 1022 to apply a ping signal to the fourth coil 1026a if the application of the ping signal to the first coil 1016a is finished. In one example, the electronic device 101 may control the transmission ICs 1012 and 1022 to apply ping signals in the order of the first coil 1016a, the fourth coil 1026a, the second coil 1016b, the fifth coil 1026b, the third coil 1016c, and the sixth coil 1026c, but the order is not limited. For example, the electronic device 101 may control the transmission ICs 1012 and 1022 to apply ping signals in the order of the third coil 1016c, the fourth coil 1026a, the second coil 1016b, the fifth coil 1026b, the first coil 1016a, and the sixth coil 1026c. The electronic device 101 may identify information from each of the plurality of coils while applying the ping signal. For example, the wireless power reception device may receive the ping signal and transmit information about the SSP in response to the ping signal. The wireless power reception device may perform on/off keying modulation based on the information about the SSP. The electronic device 101 may identify the SSP corresponding to a specific coil based on a demodulation result of current and/or voltage applied to the specific coil. The electronic device 101 may identify the SSP corresponding to each of the plurality of coils. The SSP may be identified for the coil where a wireless power reception device is disposed, but the SSP may not be identified for the coil where a wireless power reception device is not disposed. When a wireless power reception device is not disposed, the electronic device 101 fails in demodulation because on/off keying modulation is not performed.

According to various embodiments, in operation 1103, the electronic device 101 may select at least one coil to perform an operation based on a comparison result of information from each of the plurality of coils. For example, the electronic device 101 may select the coil corresponding to the highest SSP. The electronic device 101 may determine that a wireless power reception device is disposed on the coil selected based on the highest SSP. The electronic device 101 may perform a subsequent operation (e.g., an authentication procedure, a power transmission procedure) on the selected coil.

Figure 11B:
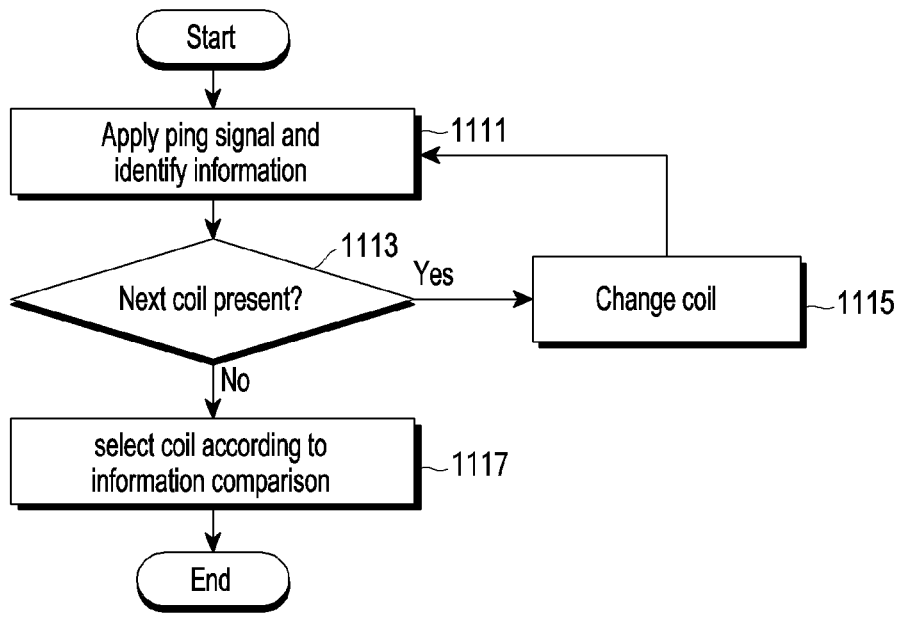
FIG. 11B is a flowchart illustrating an operation method of an electronic device according to various embodiments.

FIG. 11B is a flowchart illustrating an operation method of an electronic device according to various embodiments.

According to various embodiments, in operation 1111, the electronic device 101 (e.g., the MCU 1005 and at least one of the plurality of transmission ICs 1012, 1022, and 1032) may apply a ping signal to the coil and identify information (e.g., SSP) while applying the ping signal. The first coil may be set according to a designated order. In operation 1113, the electronic device 101 may determine whether there is the next coil. The electronic device 101 may determine whether a next coil to be measured is present by applying a ping signal after the coil for which measurement is currently performed based on the designated order. If the next coil is present (yes in 1113), the electronic device 101 may change the coil (e.g., select a different coil) to be measured in operation 1115. The electronic device 101 may identify the next coil to be measured based on the designated order. The electronic device 101 may repeat operations of changing a coil, applying a ping signal, and identifying information until there is no next coil (no in 1113). When the measurement up to the last coil is completed, the electronic device 101 may select a coil according to comparison of information about each of the plurality of coils in operation 1117.

Figure 11C:
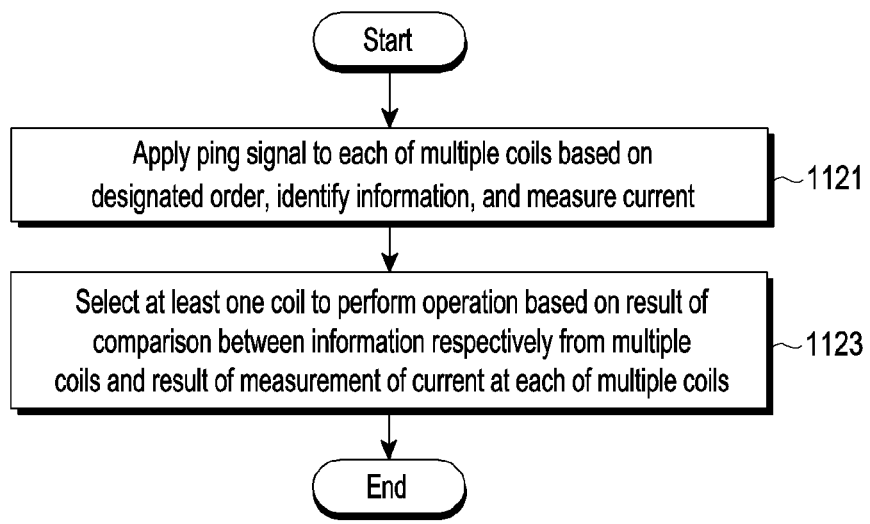
FIG. 11C is a flowchart illustrating an operation method of an electronic device according to various embodiments.

FIG. 11C is a flowchart illustrating an operation method of an electronic device according to various embodiments.

According to various embodiments, in operation 1121, the electronic device 101 (e.g., the MCU 1005 and at least one of the plurality of transmission ICs 1012, 1022, and 1032) may perform ping signal application, information identification and current measurement, e.g., SSP current measurement, on each of the plurality of coils based on a designated order. While the ping signal is applied to any one coil, the electronic device 101 may identify the SSP based on a demodulation result and measure the magnitude of the current applied to the coil. As described above, the SSP current may be related to alignment between the coils. For example, it may be identified that the SSP current value in the first coil 1016a is a first value, and the SSP current value in the second coil 1016b is a second value. The first value being smaller than the second value may mean that the first coil 1016a is better aligned with the coil of the wireless power reception device than the second coil 101b. Meanwhile, the SSP current value being 0 may mean that a wireless power reception device is not disposed on the corresponding coil.

According to various embodiments, in operation 1123, the electronic device 101 may execute at least one coil to perform an operation based on a comparison result of information from each of the plurality of coils and a result of measurement of current at each of the plurality of coils. For example, the electronic device 101 may identify information and measurement results as shown in Table 1.

TABLE 1

| coil | #1 | #2 | #3 | #4 | #5 | #6 |
|---|---|---|---|---|---|---|
| SSP | 0 | 0 | 80 | 120 | 60 | 0 |
| SSP current(mA) | 0 | 0 | 170 | 150 | 200 | 0 |

In Table 1, the SSP current may indicate, for example, the magnitude of current measured at the corresponding coil while a signal including the SSP is received. The magnitude being 0 may refer to, e.g., that demodulation of the signal including the SSP fails, so that the magnitude of the corresponding current is not measured or recorded.

For example, when the wireless power reception device is disposed over the third coil 1016c, the fourth coil 1026a, and the fifth coil 1026b of the electronic device 101, demodulation results corresponding to the third coil 1016c, the fourth coil 1026a and the fifth coil 1026b may be identified. The electronic device 101 may identify the SSPs (e.g., 80, 120, and 60) respectively corresponding to the third coil 1016c, the fourth coil 1026a, and the fifth coil 1026b, based on the demodulation results corresponding to the third coil 1016c, the fourth coil 1026a, and the fifth coil 1026b. The electronic device 101 may identify SSP currents (e.g., 170 mA, 150 mA, and 200 mA) corresponding to the third coil 1016c, the fourth coil 1026a, and the fifth coil 1026b. The electronic device 101 may select the fourth coil 1026a corresponding to the highest SSP. The electronic device 101 may select the fourth coil 1026a corresponding to the lowest SSP current among values other than 0. Alternatively, the electronic device 101 may select the fourth coil 1026a considering both the SSP and the SSP current. There is no limitation to the scheme considering both SSP and SSP current. For example, the electronic device 101 may assign weights to SSP and SSP current and select one coil based on the assigned weights. Meanwhile, there are no limitation on the parameters for selecting the coil other than SSP and SSP current. For example, although current is used in scheme above for analyzing the SSP, other electrical characteristics, e.g., voltage, can be utilized without departing from the scope of the invention.

Meanwhile, in another embodiment, similar to FIG. 11B, the electronic device 101 may perform ping signal application, information identification, and current measurement on any one coil and change to the next coil based on the designated order. If information identification and current measurement are completed up to the last coil, the electronic device 101 may select a coil based on the identified information and the measured current.

Figure 12:
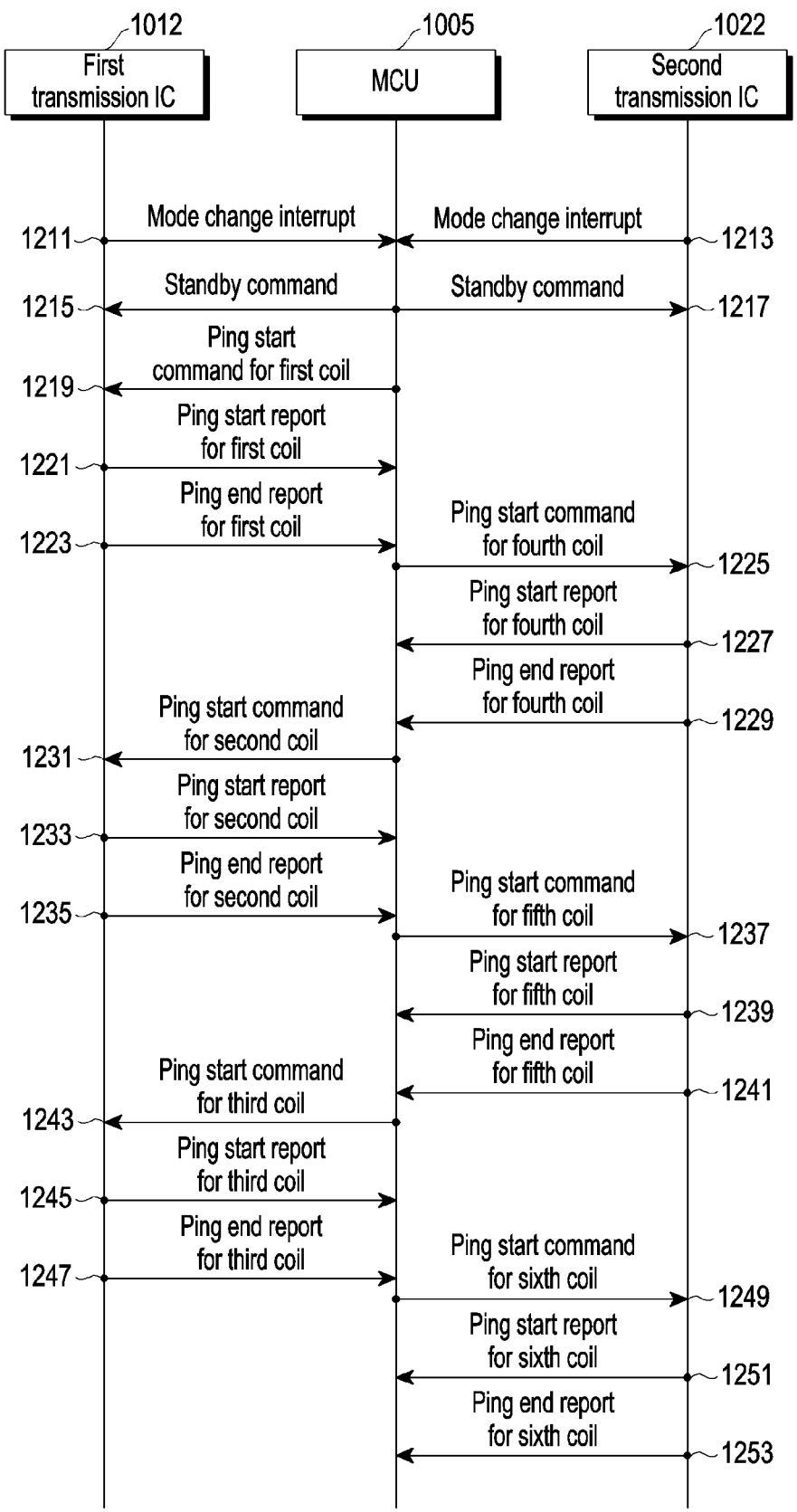
FIG. 12 is a flowchart illustrating an operation method of an electronic device according to various embodiments.

FIG. 12 is a flowchart illustrating an operation method of an electronic device according to various embodiments.

According to various embodiments, the MCU 1005 may receive a mode change interrupt from the first transmission IC 1012 in operation 1211. The MCU 1005 may receive a mode change interrupt from the second transmission IC 1022 in operation 1213. For example, the first transmission IC 1012 and the second transmission IC 1022 may transmit the mode change interrupt to the MCU 1005 when preparation for performing a ping procedure is completed. The MCU 1005 may provide a standby command to the first transmission IC 1012 in response to the received mode change interrupt in operation 1215. The MCU 1005 may provide a standby command to the second transmission IC 1022 in response to the received mode change interrupt in operation 1217. The standby command may be a command to prepare for a ping signal application operation. Providing a standby command in response to the mode change interrupt is exemplary and may be omitted. According to an embodiment, the standby command may allow the transmission ICs 1012 and 1022 to set the on/off states of the plurality of switches to the default state. Based on the standby command, the first transmission IC 1012 may control the first coil selection switch 1013*a*, the second coil selection switch 1013*b*, and the third coil selection switch 1013*c* in an off state and control the first demodulation switch 1017*a*, the second demodulation switch 1017*b* and the third demodulation switch 1017*c* in an on state. Based on the standby command, the second transmission IC 1022 may control the fourth coil selection switch 1023*a*, the fifth coil selection switch 1023*b*, and the sixth coil selection switch 1023*c* in an off state and control the fourth demodulation switch 1027*a*, the fifth demodulation switch 1027*b* and the sixth demodulation switch 1027*c* in an on state.

According to various embodiments, the MCU 1005 may provide a standby command and may provide commands to the first transmission IC 1012 and the second transmission IC 1022 to sequentially apply a ping signal to each of the plurality of coils. According to an embodiment, an order of transmission of ping signals may be stored in a memory (not shown) of the electronic device 101. The MCU 1005 may load the transfer the order from the memory (not shown). For example, the transmission order may be a designated order or an order based on the user's use pattern. In the embodiment of FIG. 12, ping signals may be set to be applied in the order of the first coil 1016*a*, the fourth coil 1026*a*, the second coil 1016*b*, the fifth coil 1026*b*, the third coil 1016*c*, and the sixth coil 1026*c*. According to the set order, the MCU 1005 may transmit a ping start command to the first coil 1016*a* in operation 1219. The first transmission IC 1012 may control to apply a ping signal to the first coil 1016*a* based on the ping start command. For example, the first transmission IC 1012 may control the first coil selection switch 1013*a* in FIG. 10A in an on state and control the second coil selection switch 1013*b* and the third coil selection switch 1013*c* in an off state. The first transmission IC 1012 may control the first demodulation switch 1017*a* in an off state and control the second demodulation switch 1017*b* and the third demodulation switch 1017*c* in an on state while demodulating the signal provided through the first demodulation switch 1017*a*. The first transmission IC 1012 may control to apply the ping signal to the first coil 1016*a* for a first period (e.g., 88 ms). The first transmission IC 1012 may report the start of ping for the first coil 1016*a* to the MCU 1005 in operation 1221. The first transmission IC 1012 may report the end of ping for the first coil 1016*a* to the MCU 1005 in operation 1223. The MCU 1005 may identify that the ping procedure for the first coil 1016*a* is ended, based on the report of the start of the ping in operation 1221 and the report of the end of the ping in operation 1223. According to an embodiment, the first transmission IC 1012 may set the on/off state of the plurality of switches 1013*a*, 1013*b*, 1013*c*, 1017*a*, 1017*b*, and 1017*c* to the default state when the ping procedure for the first coil 1016*a* is ended. Thereafter, the MCU 1005 may provide a ping start command for the fourth coil 1026*a* to the second transmission IC 1022 in operation 1225. A period of, e.g., 200 ms may be provided between the timing of the ping start command for the first coil 1016*a* in operation 1219 and the timing of the ping start command for the fourth coil 1026*a* in operation 1225, but is not limited thereto. Accordingly, while the ping signal is applied to the first coil 1016*a*, no ping signal may be applied to the other coils.

According to the set order, the MCU 1005 may transmit a ping start command to the fourth coil 1026*a* in operation 1225. The second transmission IC 1022 may control to apply a ping signal to the fourth coil 1026*a* based on the ping start command. For example, the second transmission IC 1022 may control the fourth coil selection switch 1023*a* in FIG. 10A in an on state and control the fifth coil selection switch 1023*b* and the sixth coil selection switch 1023*c* in an off state. The second transmission IC 1022 may control the fourth demodulation switch 1027*a* in an off state and control the fifth demodulation switch 1027*b* and the sixth demodulation switch 1027*c* in an on state while demodulating the signal provided through the fourth demodulation switch 1027*a*. The second transmission IC 1022 may control to apply the ping signal to the fourth coil 1026*a* for the first period (e.g., 88 ms). The second transmission IC 1022 may report the start of ping for the fourth coil 1026*a* to the MCU 1005 in operation 1227. The second transmission IC 1022 may report the end of ping for the fourth coil 1026*a* to the MCU 1005 in operation 1229. The MCU 1005 may identify that the ping procedure for the fourth coil 1026*a* is ended, based on the report of the start of the ping in operation 1227 and the report of the end of the ping in operation 1229.

The MCU 1005 may control the ping procedure to be sequentially performed on the second coil 1016*b*, the fifth coil 1026*b*, the third coil 1016*c*, and the sixth coil 1026*c* according to the set order, Operations 1231, 1233, and 1235 may be substantially the same as operations 1219, 1221, and 1223 except that the coil to which the ping signal is applied is the second coil 1016*b*. Further, the first transmission IC 1012 may control the states of switches corresponding to the second coil 1016*b*. For example, the first transmission IC 1012 may control the first coil selection switch 1013*a* in an on state and control the first coil selection switch 1013*a* and the third coil selection switch 1013*c* in an off state. As another example, the first transmission IC 1012 may control the second demodulation switch 1017*b* in an off state and control the first demodulation switch 1017*a* and the third demodulation switch 1017*c* in an on state. Operations 1237, 1239, and 1241 may be substantially the same as operations 1225, 1227, and 1229 except that the coil to which the ping signal is applied is the fifth coil 1026*b*. Further, the second transmission IC 1022 may control the states of switches corresponding to the fifth coil 1026*b*. For example, the second transmission IC 1022 may control the fifth coil selection switch 1023*b* in an on state and control the fourth coil selection switch 1023*a* and the sixth coil selection switch 1023*c* in an off state. As another example, the second transmission IC 1022 may control the fifth demodulation switch 1027*b* in an off state and control the fourth demodulation switch 1027*a* and the sixth demodulation switch 1027*c* in an on state. Operations 1243, 1245, and 1247 may be substantially the same as operations 1219, 1221, and 1223 except that the coil to which the ping signal is applied is the third coil 1016*c*. Further, the first transmission IC 1012 may control the states of switches corresponding to the third coil 1016*c*. For example, the first transmission IC 1012 may control the third coil selection switch 1013*c* in an on state and control the first coil selection switch 1013*a* and the second coil selection switch 1013*b* in an off state. As another example, the first transmission IC 1012 may control the third demodulation switch 1017*c* in an off state and control the first demodulation switch 1017*a* and the second demodulation switch 1017*b* in an on state. Operations 1249, 1251, and 1253 may be substantially the same as operations 1225, 1227, and 1229 except that the coil to which the ping signal is applied is the sixth coil 1026*c*. Further, the second transmission IC 1022 may control the states of switches corresponding to the sixth coil 1026*c*. For example, the second transmission IC 1022 may control the sixth coil selection switch 1023*c* in an on state and control the fourth coil selection switch 1023*a* and the fifth coil selection switch 1023*c* in an off state. As another example, the second transmission IC 1022 may control the sixth demodulation switch 1027*c* in an off state and control the fourth demodulation switch 1027*a* and the fifth demodulation switch 1027*b* in an on state.

According to various embodiments, when the wireless power reception device is not disposed on the coils, the MCU 1005 may repeat the ping procedure according to a designated order. The MCU 1005 may repeat the ping procedure according to a fixed order or may change the ping procedure execution order each time it is performed.

Figure 13:
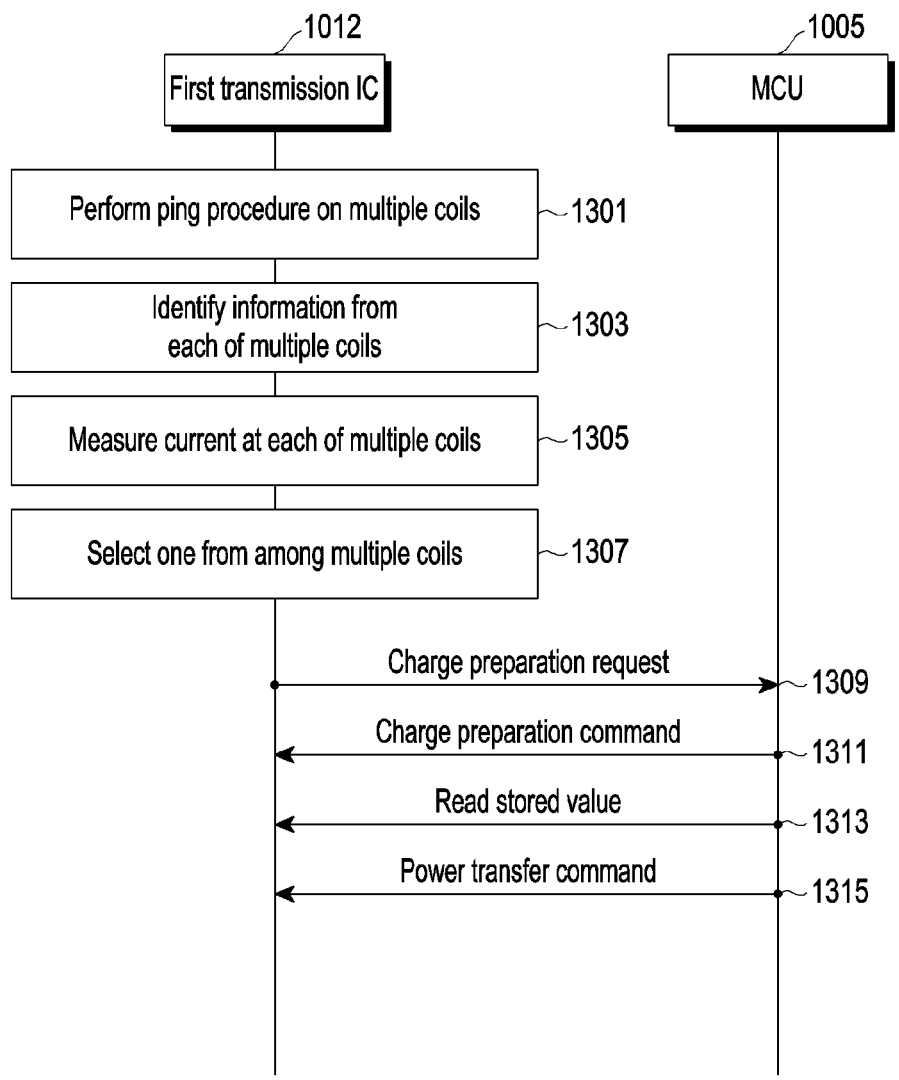
FIG. 13 is a flowchart illustrating an operation method of an electronic device according to various embodiments.

FIG. 13 is a flowchart illustrating an operation method of an electronic device according to various embodiments.

According to various embodiments, in operation 1301, the first transmission IC 1012 may perform a ping procedure on a plurality of coils. For example, as shown in FIG. 12, the first transmission IC 1012 may apply a ping signal to each of a plurality of coils associated with the first transmission IC 1012, based on a ping start command for a specific coil from the MCU 1005. In operation 1303, the first transmission IC 1012 may identify information from each of the plurality of coils. In operation 1305, the first transmission IC 1012 may measure current at each of the plurality of coils. Information identification and current measurement for each of the plurality of coils may be sequentially performed for each coil. In operation 1307, the first transmission IC 1012 may select one of the plurality of coils based on at least one of identified information or measured current. Although not shown, the second transmission IC 1022 may also perform operations 1301, 1303, 1305, and 1307. As described with reference to FIG. 12, the MCU 1005 may control the first transmission IC 1012 and the second transmission IC 1022 so that ping signals are not simultaneously applied to the plurality of coils.

According to various embodiments, the first transmission IC 1012 may transmit a charge preparation request to the MCU 1005 in operation 1309. The charge preparation request may include information (e.g., coil identification information) indicating the coil selected by the first transmission IC 1012, for example. In operation 1311, the MCU 1005 may transmit a charge preparation command to the first transmission IC 1012 based on the reception of the charge preparation request. In operation 1313, the MCU 1005 may read or access the value stored for the first transmission IC 1012. For example, the first transmission IC 1012 may store information associated with the selected coil (e.g., SSP and/or SSP current). The MCU 1005 may read the stored information. In operation 1315, the MCU 1005 may transmit a power transfer command to the first transmission IC 1012 based on the stored information. If the MCU 1005 receives the charge preparation request only from the first transmission IC 1012, the MCU 1005 may transmit a power transfer command for the coil selected by the first transmission IC 1012. For example, when SSP and SSP current are selected only for the first coil 1016*a* and the second coil 1016*b*, only the first transmission IC 1012 may transmit a charge preparation request, and the second transmission IC 1022 that has not performed any measurement may not transmit a charge preparation request. If the MCU 1005 receives a charge preparation request only from the second transmission IC 1022, the MCU 1005 may transmit a power transfer command for the coil selected by the second transmission IC 1022. If the MCU 1005 receives charge preparation requests from both the first transmission IC 1012 and the second transmission IC 1022, the MCU 1005 may compare the values read from both the transmission ICs 1012 and 1022. The MCU 1005 may select a coil based on the comparison result. The MCU 1005 may transmit a power transfer command for the selected coil to the transmission IC corresponding to the selected coil, which is described below with reference to FIGS. 15A, 15B and 15C.

Alternatively, the MCU 1005 may transmit power transfer commands to both the first transmission IC 1012 and the second transmission IC 1022. When the first transmission IC 1012 selects the first coil 1016*a*, and the second transmission IC 1022 selects the sixth coil 1026*c*, the MCU 1005 may transmit power transfer commands to all of the one or more transmission ICs 1012 and 1022 so that all of the selected coils perform charging. In one example, when it is determined that the coil selected by the first transmission IC 1012 and the coil selected by the second transmission IC 1022 are spaced apart by a designated distance or more, the MCU 1005 may determine to perform charging on both the coils. For example, when a difference between the identification number of the coil selected by the first transmission IC 1012 and the identification number of the coil selected by the second transmission IC 1022 is a designated value or more, the MCU 1005 may determine to perform charging on both the coils and transmit power transfer commands to all of the one or more transmission ICs 1012 and 1022.

Figure 14:
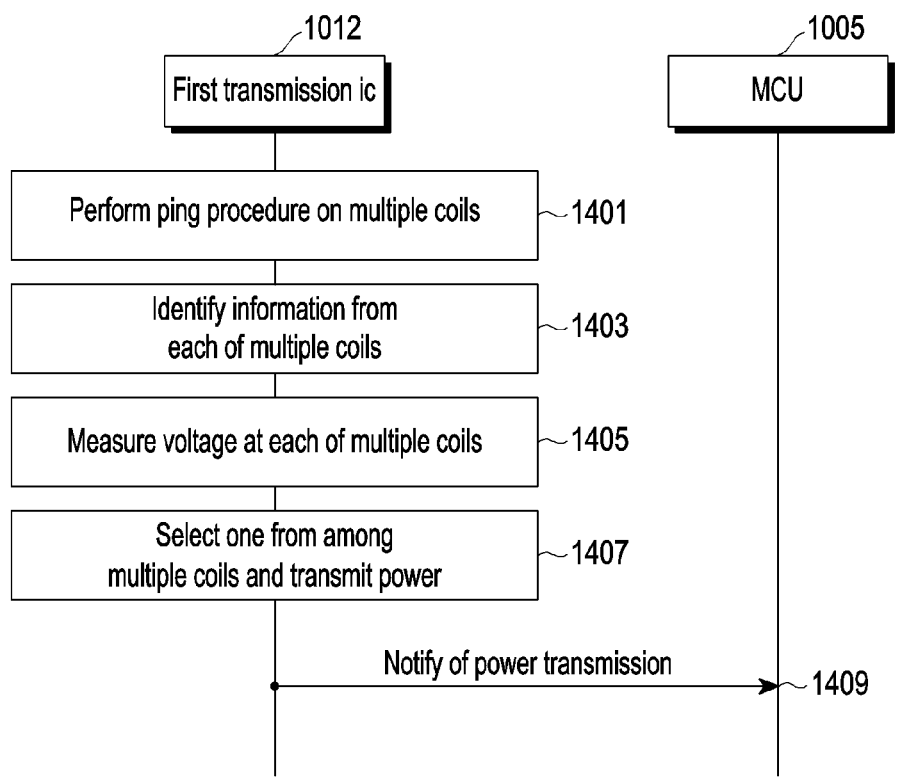
FIG. 14 is a flowchart illustrating an operation method of an electronic device according to various embodiments.

FIG. 14 is a flowchart illustrating an operation method of an electronic device according to various embodiments. Operations 1401, 1403, and 1405 may be substantially the same as operations 1301, 1303, and 1305 of FIG. 13 and, thus, a description thereof will not be repeated for the sake of brevity.

According to various embodiments, in operation 1407, the first transmission IC 1012 may select one of the plurality of coils based on at least one of identified information or measured current and initiate charging. As compared to the embodiment of FIG. 13, the first transmission IC 1012 may directly start power transmission without a separate power transfer command from the MCU 1005. In operation 1409, the first transmission IC 1012 may notify the MCU 1005 of power transmission. In one example, the first transmission IC 1012 may initiate charging on the selected coil without any particular condition determination and may notify the MCU 1005 of power transmission. For example, the first transmission IC 1012 may start charging the selected coil without determining any particular conditions. In another example, the first transmission IC 1012 may determine whether a power transmission condition is met and, upon determining that the power transmission condition is met, initiate charging of the selected coil and notify the MCU 1005 of power transmission. For example, the power transmission condition may be that the coil selected by the first transmission IC 1012 may be one selected from the remaining coils (e.g., the first coil 1016*a* and the second coil 1016*b*)

other than the coil (e.g., the third coil 1016*c*) disposed in a position adjacent to one of the coils controlled by the second transmission IC 1022, but is not limited thereto. In this case, if the power transmission condition is not met (e.g., if the third coil 1016*c* is selected), the first transmission IC 1012 may transmit a charge preparation request to the MCU 1006 and, upon receiving a power transfer command from the MCU 1006, initiate charging as shown in FIG. 13.

Figure 15:
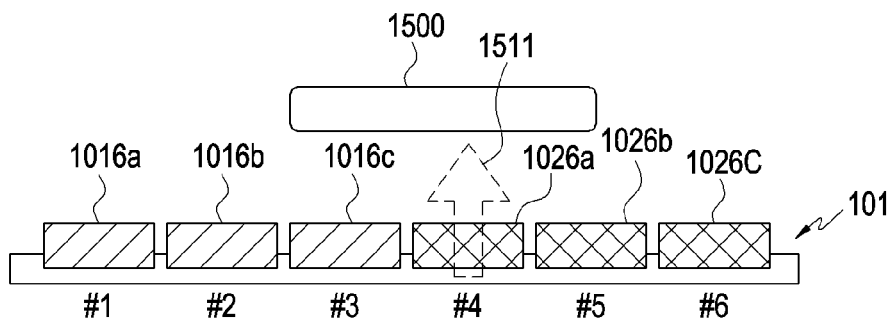
FIG. 15A illustrates an example of disposing a wireless power reception device on a plurality of coils according to various embodiments.
FIG. 15B illustrates an example of disposing a wireless power reception device on a plurality of coils according to various embodiments.
FIG. 15C illustrates an example of disposing a wireless power reception device on a plurality of coils according to various embodiments.
Figure 15:
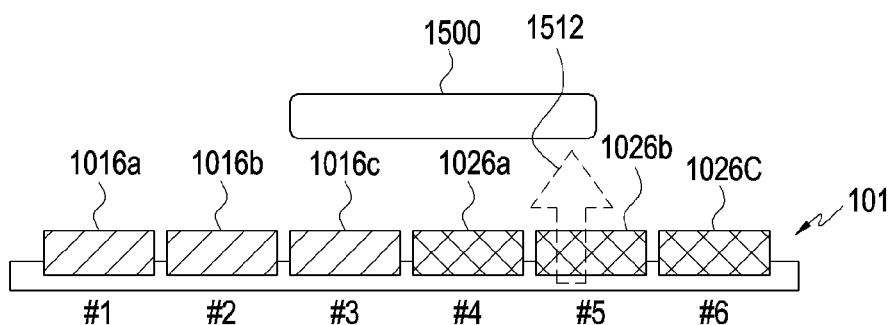
Figure 15:
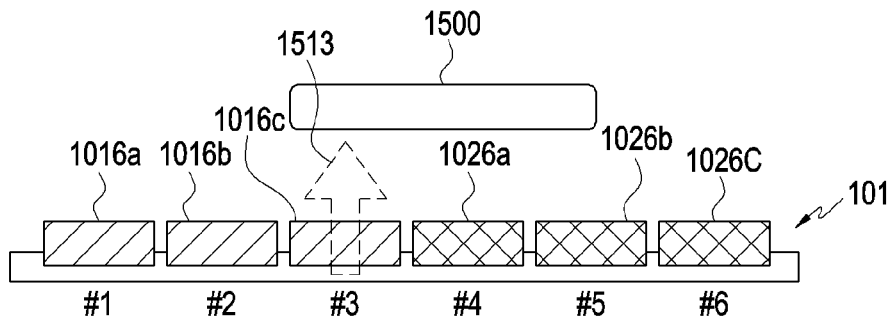
Figure 16A:
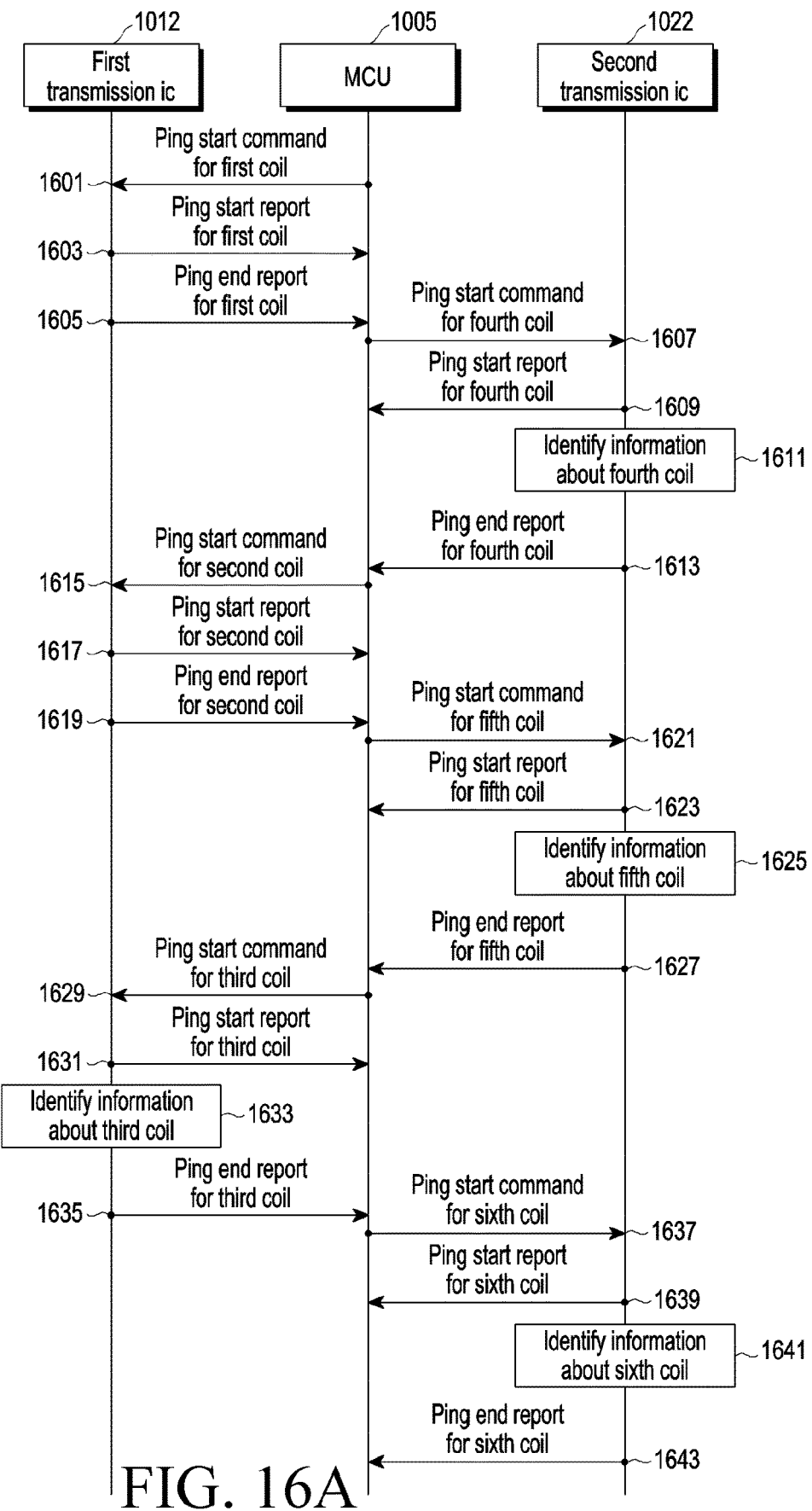
FIG. 16A is a flowchart illustrating an operation method of an electronic device according to various embodiments.
Figure 16B:
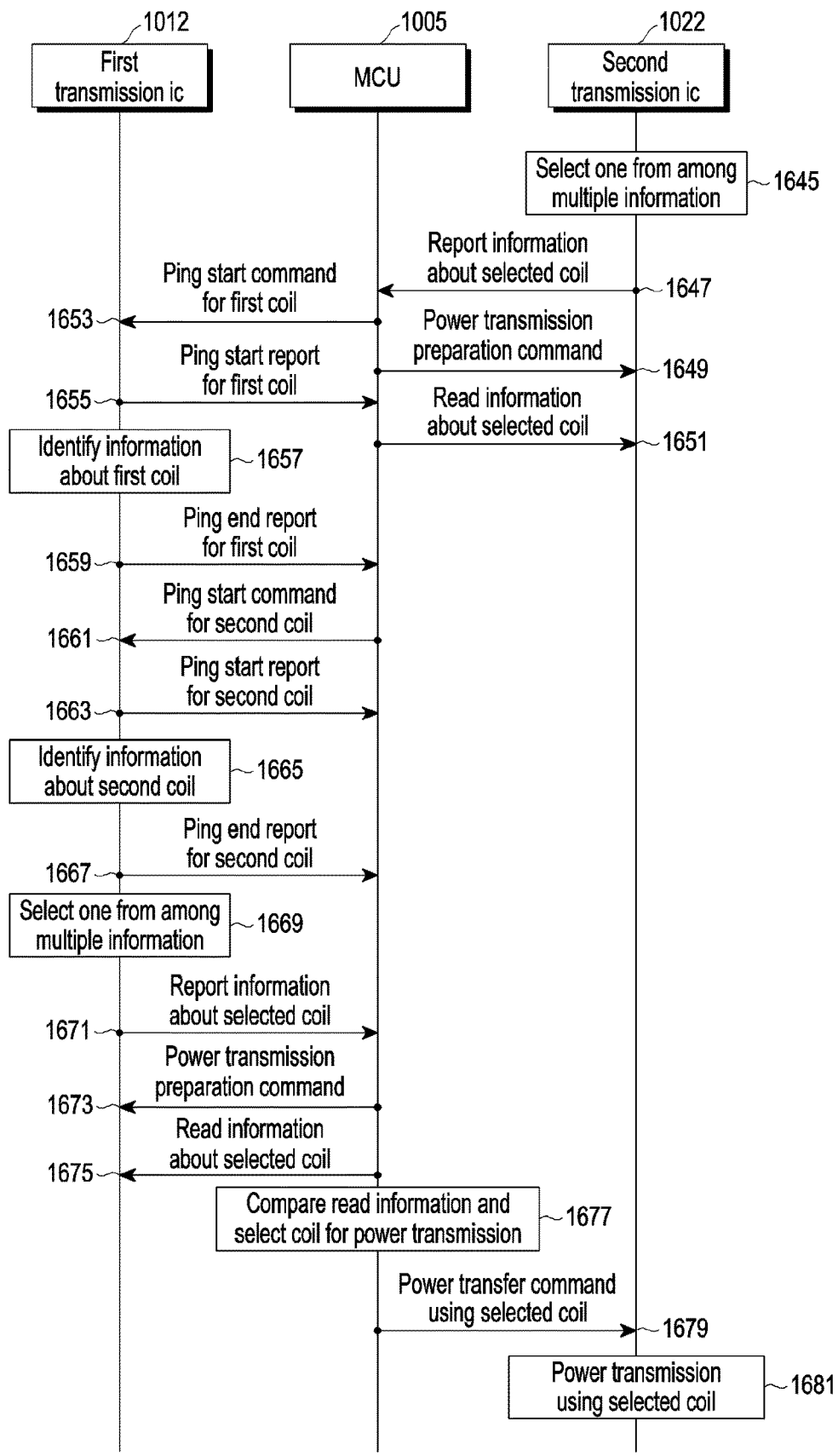
FIG. 16B is a flowchart illustrating an operation method of an electronic device according to various embodiments.

FIG. 15A illustrates an example of disposing a wireless power reception device on a plurality of coils according to various embodiments. FIG. 15B illustrates an example of disposing a wireless power reception device on a plurality of coils according to various embodiments. FIG. 15C illustrates an example of disposing a wireless power reception device on a plurality of coils according to various embodiments. The embodiment of FIGS. 15A to 15C is described with reference to FIGS. 16A and 16B. FIGS. 16A and 16B are flowcharts illustrating a method for operating an electronic device according to an embodiment. Operations 1401, 1403, and 1405 may be substantially the same as operations 1301, 1303, and 1305 of FIG. 13 and, thus, a description thereof will not be repeated for the sake of brevity.

Referring to FIGS. 15A, 15B, and 15C, according to various embodiments, the electronic device 101 may include a plurality of coils 1016*a*, 1016*b*, 1016*c*, 1026*a*, 1026*b*, and 1026*c*. The wireless power reception device 1500 may be disposed on the third coil 1016*c*, the fourth coil 1026*a*, and the fifth coil 1026*b*. Referring to FIG. 16A, the MCU 1005 may transmit a ping start command for the first coil 1016*a* to the first transmission IC 1012 in operation 1601. The first transmission IC 1012 may apply a ping signal to the first coil 1016*a*. The first transmission IC 1012 may report the ping signal start for the first coil 1016*a* to the MCU 1005 in operation 1603 and report the end of the ping for the first coil 1016*a* to the MCU 1005 in operation 1605. Although the ping signal is applied to the first coil 1016*a*, since the wireless power reception device 1500 is not disposed on the first coil 1016*a*, the first transmission IC 1012 may fail to detect demodulation by the wireless power reception device 1500 corresponding to the ping signal.

According to various embodiments, the MCU 1005 may transmit a ping start command for the fourth coil 1026*a* to the second transmission IC 1022 in operation 1607. For example, as shown in FIG. 15A, the second transmission IC 1022 may apply a ping signal 1511 to the fourth coil 1026*a*. The second transmission IC 1022 may report the ping signal start for the fourth coil 1026*a* to the MCU 1005 in operation 1603. In operation 1611, the second transmission IC 1022 may identify information about the fourth coil 1026*a*. For example, the second transmission IC 1022 may identify information indicating that the SSP of the fourth coil 1026*a* is 120 and the SSP current is 150 mA. The second transmission IC 1022 may report the end of ping for the fourth coil 1026*a* to the MCU 1005 in operation 1613.

According to various embodiments, the MCU 1005 may transmit a ping start command for the second coil 1016*b* to the first transmission IC 1012 in operation 1615. The first transmission IC 1012 may apply a ping signal to the second coil 1016*b*. The first transmission IC 1012 may report the ping signal start for the second coil 1016*b* to the MCU 1005 in operation 1617 and report the end of the ping for the second coil 1016*b* to the MCU 1005 in operation 1619. Although the ping signal is applied to the second coil 1016*b*, since the wireless power reception device 1500 is not disposed on the second coil 1016*b*, the first transmission IC 1012 may fail to detect demodulation by the wireless power reception device 1500 corresponding to the ping signal.

According to various embodiments, the MCU 1005 may transmit a ping start command for the fifth coil 1026*b* to the second transmission IC 1022 in operation 1621. For example, as shown in FIG. 15B, the second transmission IC 1022 may apply a ping signal 1512 to the fifth coil 1026*b*. The second transmission IC 1022 may report the ping signal start for the fifth coil 1026*b* to the MCU 1005 in operation 1623. In operation 1611, the second transmission IC 1022 may identify information about the fifth coil 1026*b*. For example, the second transmission IC 1022 may identify information indicating that the SSP of the fifth coil 1026*b* is 60 and the SSP current is 200 mA. The second transmission IC 1022 may report the end of ping for the fifth coil 1026*b* to the MCU 1005 in operation 1627.

According to various embodiments, the MCU 1005 may transmit a ping start command for the third coil 1016*c* to the first transmission IC 1012 in operation 1629. For example, as shown in FIG. 15C, the first transmission IC 1012 may apply a ping signal 1513 to the third coil 1016*c*. The first transmission IC 1012 may report the ping signal start for the third coil 1016*c* to the MCU 1005 in operation 1631. In operation 1633, the first transmission IC 1012 may identify information about the third coil 1016*c*. For example, the first transmission IC 1022 may identify information indicating that the SSP of the third coil 1016*c* is 80 and the SSP current is 170 mA. The first transmission IC 1012 may report the end of ping for the third coil 1016*c* to the MCU 1005 in operation 1635.

According to various embodiments, the MCU 1005 may transmit a ping start command for the sixth coil 1026*c* to the second transmission IC 1022 in operation 1637. The second transmission IC 1022 may apply a ping signal to the sixth coil 1026*c*. The second transmission IC 1022 may report the ping signal start for the sixth coil 1026*c* to the MCU 1005 in operation 1639 and identify information about the sixth coil 1026*c* in operation 1641. However, since the wireless power reception device 1500 is not disposed on the sixth coil 1026*c*, the second transmission IC 1022 may identify an SSP of 0 and an SSP current of 0. For example, the second transmission IC 1022 may identify the SSP and SSP current based on identifying that the SSP and SSP current for the fourth coil 1026*a* and the fifth coil 1026*b* are identified and identify and/or record the values. If information is identified from none of the coils before measuring a specific coil, i.e., if demodulation fails, the electronic device 101 may not identify and/or record the measurement result on a previous coil and specific coil. The second transmission IC 1022 may report the end of ping for the sixth coil 1026*c* to the MCU 1005 in operation 1643.

Referring to FIG. 16B, in operation 1645, the second transmission IC 1022 may select one coil to perform power transmission to the wireless power reception device 1500 based on information about each of the coils 1026*a*, 1026*b*, and 1026*c*.

In operation 1647, the second transmission IC 1022 may report information about the selected coil. For example, the second transmission IC 1022 may select the fourth coil 1026*a* based on the SSP and the SSP current and may report information indicating the fourth coil 1026*a* to the MCU 1005. Although FIGS. 16A and 16B illustrate that the second transmission IC 1022 reports a ping end report in operation 1643 and reports information about the selected coil to the MCU 1005 in operation 1647, this is exemplary. In another example, the second transmission IC 1022 may omit the ping end report on the last coil after terminating the information identification on all of the coils 1026*a*, 1026*b*, and 1026*c* and transmit information about the selected coil to the MCU 1005. Upon receiving the information about the selected coil, the MCU 1005 may determine that ping application for the coil to which the ping signal is applied is terminated. In operation 1649, the MCU 1005 may transmit a power transmission preparation command to the second transmission IC 1022. The MCU 1005 may read information about the selected coil. For example, the MCU 1005 may read SSP: 120 and SSP current: 150 mA for the fourth coil 1026*a*, which is the selected coil.

According to various embodiments, the MCU 1005 may transmit a ping start command for the first coil 1026*c* to the first transmission IC 1012 in operation 1653. Since the MCU 1005 has not received information about the selected coil from the first transmission IC 1012, the MCU 1005 may be implemented to transmit a ping start command to the first transmission IC 1012. For example, in FIG. 16B, the first transmission IC 1012 may initially identify the SSP and SSP current and then perform the identification procedure on unidentified coils and then select one coil. However, this is merely an example, and the first transmission IC 1012 may select a coil if a ping procedure for the last coil in order is terminated.

According to various embodiments, the first transmission IC 1012 may apply a ping signal to the first coil 1026*a*. The first transmission IC 1012 may report the ping signal start for the first coil 1016*a* to the MCU 1005 in operation 1655 and identify information about the first coil 1016*a* in operation 1657. However, since the wireless power reception device is not disposed on the first coil 1016*a*, the first transmission IC 1012 may identify the SSP of 0 and the SSP current of 0 and record the identification result to the first transmission IC 1012. For example, the first transmission IC 1012 may record information about the SSP and SSP current corresponding to the third coil 1026*c* based on identifying the SSP based on success in demodulation for the third coil 1026*c*. Thereafter, although demodulation on the first coil 1026*a* fails, information indicating that the SSP is 0 and the SSP current is 0 may be recorded. However, this is merely an example, and the first transmission IC 1012 may be configured to update the information whenever a ping procedure is performed. The second transmission IC 1012 may report the end of ping for the first coil 1016*a* to the MCU 1005 in operation 1659. The MCU 1005 may provide a ping start command for the second coil 1016*b* to the first transmission IC 1012 in operation 1661. The first transmission IC 1012 may apply a ping signal to the second coil 1026*b*. The first transmission IC 1012 may report the ping signal start for the second coil 1016*b* to the MCU 1005 in operation 1663 and identify information about the second coil 1016*b* in operation 1665. However, since the wireless power reception device is not disposed on the second coil 1016*b*, the first transmission IC 1012 may identify the SSP of 0 and the SSP current of 0. The first transmission IC 1012 may report the end of ping for the second coil 1016*b* to the MCU 1005 in operation 1667. The first transmission IC 1012 may select any one coil based on the identified information (e.g., SSP and SSP current).

According to various embodiments, in operation 1669, the first transmission IC 1012 may report information about the selected coil. For example, the first transmission IC 1012 may select the third coil 1016*c* based on the SSP and the SSP current and may report information indicating the third coil 1016*c* to the MCU 1005. Although FIGS. 16A and 16B illustrate that the first transmission IC 1012 reports a ping end report in operation 1667 and reports information about the selected coil to the MCU 1005 in operation 1671, this is exemplary. In another example, the first transmission IC 1012 may omit the ping end report on the last coil after terminating the information identification on all of the coils 1016*a*, 1016*b*, and 1016*c* and transmit information about the selected coil to the MCU 1005. Upon receiving the information about the selected coil, the MCU 1005 may determine that ping application for the coil to which the ping signal is applied is terminated. In operation 1673, the MCU 1005 may transmit a power transmission preparation command to the first transmission IC 1012. The MCU 1005 may read information about the selected coil. For example, the MCU 1005 may read SSP: 80 and SSP current: 170 mA for the third coil 1016*c*, which is the selected coil.

According to various embodiments, the MCU 1005 may compare the information read in operation 1677 to select a coil for power transmission. For example, the MCU 1005 may compare SSP: 80, SSP current: 170 mA for the third coil 1016*c*, read from the first transmission IC 1012, and SSP: 120, SSP current: 150 mA for the fourth coil 1026*a*, read from the second transmission IC 1022. Based on the comparison result, the MCU 1005 may select, e.g., the fourth coil 1026*a*. In operation 1679, the MCU 1005 may transmit a power transfer command using the selected coil (e.g., the fourth coil 1026*a*) to the transmission IC (e.g., the second transmission IC 1022) corresponding to the selected coil. In operation 1681, the second transmission IC 1022 that has received the power transfer command may transmit power through the selected coil (e.g., the fourth coil 1026*a*). Although not shown, the MCU 1005 may command to transmit power through a plurality of coils based on the information about the selected coil, read from the second transmission IC 1022 through operation 1651, and the information about the selected coil, read from the first transmission IC 1012 through operation 1675. For example, when the plurality of wireless power reception devices meet a designated condition for receiving wireless power from the electronic device 101, the MCU 1005 may transmit a power transfer command using the selected coil, to each of the first transmission IC 1012 and the second transmission IC 1022. The designated condition may be based on the distance between the coil selected by the first transmission IC 1012 and the coil selected by the second transmission IC 1022.

According to various embodiments, the first transmission IC 1012 and/or the second transmission IC 1022 may report information about the corresponding coil (e.g., SSP and/or SSP current) through the same message or different messages when reporting the end of ping to the MCU 1005. According to various embodiments, the first transmission IC 1012 and/or the second transmission IC 1022 may report the SSP and/or SSP current to the MCU 1005 through the same message or different messages when reporting information about the selected coil (e.g., identification information) to the MCU 1005.

According to various embodiments, when the electronic device 101 includes a plurality of transmission ICs (e.g., the first transmission IC 1012 and the second transmission IC 1022), it may determine whether to transmit power to the second wireless power reception device through the second transmission IC 1022 while transmitting power to the first wireless power reception device through the first transmission IC 1012. For example, the MCU 1005 may control to apply a ping signal through at least one coil (e.g., 1026*a*, 1026*b*, and 1026*c* of FIGS. 15A, 15B, and 15C) to the second transmission IC 1022 while transmitting power to the first wireless power reception device through the first transmission IC 1012. According to an embodiment, upon determining whether to transmit power to the second wireless power reception device through the second transmission IC 1022 while transmitting power to the first wireless power reception device through the first transmission IC 1012, the electronic device 101 may control the coil to which a ping signal is to be applied by the second transmission IC 1022 based on the coil selected for power transmission by the first transmission IC 1012. For example, when the first transmission IC 1012 is transmitting power to the first wireless power reception device through the third coil (e.g., 1016c of FIGS. 15A, 15B, and 15C), the MCU 1005 may control to apply a ping signal for the second transmission IC 1022 to detect the second wireless power reception device through the fifth coil (e.g., 1026b of FIGS. 15A, 15B, and 15C) or the sixth coil (e.g., 1026c of FIGS. 15A, 15B, and 15C). According to an embodiment, the MCU 1005 may set the coil selection switch to become the off state and the demodulation switch to become the on state to allow the demodulation path to be connected to the ground, for the other coils than the coil to which the ping signal is applied to the second wireless power reception device and the coil transmitting power to the first wireless power reception device.

Figure 17:
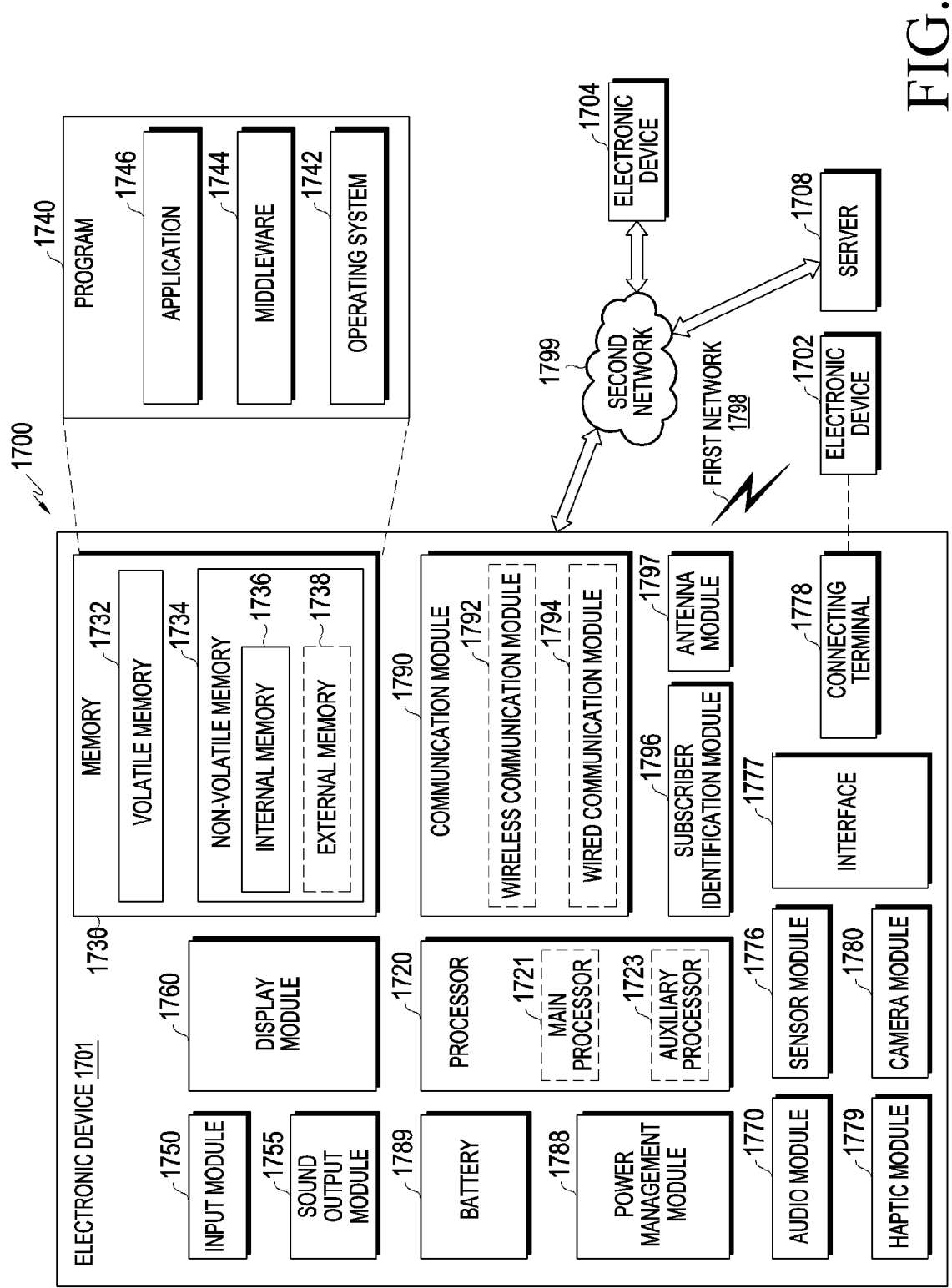
FIG. 17 is a block diagram illustrating an electronic device in a network environment according to various embodiments.

An electronic device 1701 capable of wirelessly receiving power by the electronic device 101 according to various embodiments is described below. FIG. 17 is a block diagram illustrating an electronic device 1701 in a network environment 1700 according to various embodiments. Referring to FIG. 17, the electronic device 1701 in the network environment 1700 may communicate with an electronic device 1702 via a first network 1798 (e.g., a short-range wireless communication network), or an electronic device 1704 or a server 1708 via a second network 1799 (e.g., a long-range wireless communication network). According to an embodiment, the electronic device 1701 may communicate with the electronic device 1704 via the server 1708. According to an embodiment, the electronic device 1701 may include a processor 1720, memory 1730, an input module 1750, a sound output module 1755, a display module 1760, an audio module 1770, a sensor module 1776, an interface 1777, a connecting terminal 1778, a haptic module 1779, a camera module 1780, a power management module 1788, a battery 1789, a communication module 1790, a subscriber identification module (SIM) 1796, or an antenna module 1797. In some embodiments, at least one (e.g., the connecting terminal 1778) of the components may be omitted from the electronic device 1701, or one or more other components may be added in the electronic device 101. According to an embodiment, some (e.g., the sensor module 1776, the camera module 1780, or the antenna module 1797) of the components may be integrated into a single component (e.g., the display module 1760).

The processor 1720 may execute, for example, software (e.g., a program 1740) to control at least one other component (e.g., a hardware or software component) of the electronic device 1701 coupled with the processor 1720, and may perform various data processing or computation. According to one embodiment, as at least part of the data processing or computation, the processor 1720 may store a command or data received from another component (e.g., the sensor module 1776 or the communication module 1790) in volatile memory 1732, process the command or the data stored in the volatile memory 1732, and store resulting data in non-volatile memory 1734. According to an embodiment, the processor 1720 may include a main processor 1721 (e.g., a central processing unit (CPU) or an application processor (AP)), or an auxiliary processor 1723 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 1701 includes the main processor 1721 and the auxiliary processor 1723, the auxiliary processor 1723 may be configured to use lower power than the main processor 1721 or to be specified for a designated function. The auxiliary processor 1723 may be implemented as separate from, or as part of the main processor 1721.

The auxiliary processor 1723 may control at least some of functions or states related to at least one component (e.g., the display module 1760, the sensor module 1776, or the communication module 1790) among the components of the electronic device 1701, instead of the main processor 1721 while the main processor 1721 is in an inactive (e.g., sleep) state, or together with the main processor 1721 while the main processor 1721 is in an active state (e.g., executing an application). According to an embodiment, the auxiliary processor 1723 (e.g., an image signal processor or a communication processor) may be implemented as part of another component (e.g., the camera module 1780 or the communication module 1790) functionally related to the auxiliary processor 123. According to an embodiment, the auxiliary processor 1723 (e.g., the neural processing unit) may include a hardware structure specified for artificial intelligence model processing. The artificial intelligence model may be generated via machine learning. Such learning may be performed, e.g., by the electronic device 1701 where the artificial intelligence is performed or via a separate server (e.g., the server 1708). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1730 may store various data used by at least one component (e.g., the processor 1720 or the sensor module 1776) of the electronic device 1701. The various data may include, for example, software (e.g., the program 1740) and input data or output data for a command related thereto. The memory 1730 may include the volatile memory 1732 or the non-volatile memory 1734. The non-volatile memory 1734 can further include internal memory 1736 and/or can exchange data with external memory 1738.

The program 1740 may be stored in the memory 1730 as software, and may include, for example, an operating system (OS) 1742, middleware 1744, or an application 1746.

The input module 1750 may receive a command or data to be used by other component (e.g., the processor 1720) of the electronic device 1701, from the outside (e.g., a user) of the electronic device 1701. The input module 1750 may include, for example, a microphone, a mouse, a keyboard, keys (e.g., buttons), or a digital pen (e.g., a stylus pen).

The sound output module 1755 may output sound signals to the outside of the electronic device 1701. The sound output module 1755 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1760 may visually provide information to the outside (e.g., a user) of the electronic device 1701. The display 1760 may include, for example, a display, a hologram device, or a projector and control circuitry to control a corresponding one of the display, hologram device, and projector. According to an embodiment, the display 1760 may include a touch sensor configured to detect a touch, or a pressure sensor configured to measure the intensity of a force generated by the touch.

The audio module 1770 may convert a sound into an electrical signal and vice versa. According to an embodiment, the audio module 1770 may obtain the sound via the input module 1750, or output the sound via the sound output module 1755 or a headphone of an external electronic device (e.g., an electronic device 1702) directly (e.g., wiredly) or wirelessly coupled with the electronic device 1701.

The sensor module 1776 may detect an operational state (e.g., power or temperature) of the electronic device 1701 or an environmental state (e.g., a state of a user) external to the electronic device 101, and then generate an electrical signal or data value corresponding to the detected state. According to an embodiment, the sensor module 1776 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 1777 may support one or more specified protocols to be used for the electronic device 1701 to be coupled with the external electronic device (e.g., the electronic device 1702) directly (e.g., wiredly) or wirelessly. According to an embodiment, the interface 1777 may include, for example, a high definition multimedia interface (HDMI), a universal serial bus (USB) interface, a secure digital (SD) card interface, or an audio interface.

A connecting terminal 1778 may include a connector via which the electronic device 1701 may be physically connected with the external electronic device (e.g., the electronic device 1702). According to an embodiment, the connecting terminal 1778 may include, for example, a HDMI connector, a USB connector, a SD card connector, or an audio connector (e.g., a headphone connector).

The haptic module 1779 may convert an electrical signal into a mechanical stimulus (e.g., a vibration or motion) or electrical stimulus which may be recognized by a user via his tactile sensation or kinesthetic sensation. According to an embodiment, the haptic module 1779 may include, for example, a motor, a piezoelectric element, or an electric stimulator.

The camera module 1780 may capture a still image or moving images. According to an embodiment, the camera module 1780 may include one or more lenses, image sensors, image signal processors, or flashes.

The power management module 1788 may manage power supplied to the electronic device 1701. According to one embodiment, the power management module 1788 may be implemented as at least part of, for example, a power management integrated circuit (PMIC).

The battery 1789 may supply power to at least one component of the electronic device 1701. According to an embodiment, the battery 1789 may include, for example, a primary cell which is not rechargeable, a secondary cell which is rechargeable, or a fuel cell.

The communication module 1790 may support establishing a direct (e.g., wired) communication channel or a wireless communication channel between the electronic device 1701 and the external electronic device (e.g., the electronic device 1702, the electronic device 1704, or the server 1708) and performing communication via the established communication channel. The communication module 1790 may include one or more communication processors that are operable independently from the processor 1720 (e.g., the application processor (AP)) and supports a direct (e.g., wired) communication or a wireless communication. According to an embodiment, the communication module 1790 may include a wireless communication module 1792 (e.g., a cellular communication module, a short-range wireless communication module, or a global navigation satellite system (GNSS) communication module) or a wired communication module 1794 (e.g., a local area network (LAN) communication module or a power line communication (PLC) module). A corresponding one of these communication modules may communicate with the external electronic device 1704 via a first network 1798 (e.g., a short-range communication network, such as Bluetooth™, wireless-fidelity (Wi-Fi) direct, or infrared data association (IrDA)) or a second network 1799 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 1792 may identify or authenticate the electronic device 1701 in a communication network, such as the first network 1798 or the second network 1799, using subscriber information (e.g., international mobile subscriber identity (IMSI)) stored in the subscriber identification module 1796.

The wireless communication module 1792 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1792 may support a high-frequency band (e.g., the mmWave band) to achieve, e.g., a high data transmission rate. The wireless communication module 1792 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1792 may support various requirements specified in the electronic device 1701, an external electronic device (e.g., the electronic device 1704), or a network system (e.g., the second network 1799). According to an embodiment, the wireless communication module 1792 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1797 may transmit or receive a signal or power to or from the outside (e.g., the external electronic device). According to an embodiment, the antenna module 1797 may include one antenna including a radiator formed of a conductor or conductive pattern formed on a substrate (e.g., a printed circuit board (PCB)). According to an embodiment, the antenna module 1797 may include a plurality of antennas (e.g., an antenna array). In this case, at least one antenna appropriate for a communication scheme used in a communication network, such as the first network 1798 or the second network 1799, may be selected from the plurality of antennas by, e.g., the communication module 1790. The signal or the power may then be transmitted or received between the communication module 1790 and the external electronic device via the selected at least one antenna. According to an embodiment, other parts (e.g., radio frequency integrated circuit (RFIC)) than the radiator may be further formed as part of the antenna module 1797.

According to various embodiments, the antenna module 1797 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1701 and the external electronic device 1704 via the server 1708 coupled with the second network 1799. The external electronic devices 1702 or 1704 each may be a device of the same or a different type from the electronic device 1701. According to an embodiment, all or some of operations to be executed at the electronic device 1701 may be executed at one or more of the external electronic devices 1702, 1704, or 1708. For example, if the electronic device 1701 should perform a function or a service automatically, or in response to a request from a user or another device, the electronic device 1701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1701. The electronic device 1701 may provide the outcome, with or without further processing of the outcome, as at least part of a reply to the request. To that end, a cloud computing, distributed computing, mobile edge computing (MEC), or client-server computing technology may be used, for example. The electronic device 1701 may provide ultra low-latency services using, e.g., distributed computing or mobile edge computing. In another embodiment, the external electronic device 1704 may include an Internet-of-things (IoT) device. The server 1708 may be an intelligent server using machine learning and/or a neural network. According to an embodiment, the external electronic device 1704 or the server 1708 may be included in the second network 1799. The electronic device 1701 may be applied to intelligent services (e.g., smart home, smart city, smart car, or healthcare) based on 5G communication technology or IoT-related technology.

According to various embodiments, the electronic device 1701 may be an example of a device capable of wireless power transmission, such as the electronic device 101. For example, the electronic device 1701 is a device supporting a reverse wireless charging function, and may support both wireless power reception and wireless power transmission. One of ordinary skill in the art will understand that, according to various embodiments, the electronic device 101 may be implemented as a device supporting a function of wirelessly transmitting power, such as a smartphone, a laptop computer, or a tablet PC, as well as a wireless charging pad.

According to various embodiments, an electronic device 101 may comprise a plurality of coils (e.g., 151a, . . . 151m), a plurality of power conversion circuits (e.g., 150a, . . . 150m) configured to respectively receive DC power, convert the DC power into AC power, and output the AC power to the plurality of coils (e.g., 151a, . . . 151m), respectively, a plurality of demodulation switches (e.g., 152a, . . . 152m) configured to connect demodulation paths, which respectively correspond to the plurality of coils (e.g., 151a, . . . 151m) selectively to a ground, and a processor (e.g., the transmission IC 110) configured to select at least one coil from among the plurality of coils (e.g., 151a, . . . 151m), control an on/off state of each of the plurality of demodulation switches (e.g., 152a, . . . 152m) to allow a demodulation path corresponding to at least one remaining coil except for the selected at least one coil among the plurality of coils (e.g., 151a, . . . 151m) to be connected to the ground and to allow a demodulation path corresponding to the selected at least one coil not to be connected to the ground, supply the AC power to the selected at least one coil, and demodulate a signal of the selected at least one coil and identify information from an external electronic device (e.g., the wireless power reception device 195) disposed corresponding to the selected at least one coil based on a result of the demodulation.

According to various embodiments, the processor (e.g., the transmission IC 110) may be a circuit for controlling the on/off state of each of the plurality of demodulation switches (e.g., 152a, . . . 152m) and be configured to control a first group of demodulation switches corresponding to the at least one remaining coil except for the selected at least one coil in an on state to allow the demodulation path corresponding to the at least one remaining coil to be connected to the ground and control a second group of demodulation switches corresponding to the selected at least one coil in an off state to allow the demodulation path corresponding to the selected at least one coil not to be connected to the ground.

According to various embodiments, the electronic device 101 may further comprise a plurality of rectifiers respectively connected to the plurality of coils (e.g., 151a, . . . 151m) and at least one filter respectively connected to the plurality of rectifiers to respectively filter the rectified signals and provide the filtered signals to the processor (e.g., the transmission IC 110). The plurality of rectifiers may respectively rectify and output signals respectively output from the plurality of coils (e.g., 151a, . . . 151m). The plurality of demodulation switches (e.g., 152a, . . . 152m) may be connected between the plurality of coils (e.g., 151a, . . . 151m) and the plurality of rectifiers, respectively.

According to various embodiments, the electronic device 101 may further comprise a plurality of coil selection switches (e.g., 161a, . . . 161m), wherein each of the plurality of coil selection switches is configured to connect the processor (e.g., the transmission IC 110) and the plurality of power conversion circuits (e.g., 150a, . . . 150m) selectively. The processor (e.g., the transmission IC 110) may be further configured to control each of the plurality of coil selection switches (e.g., 161a, . . . 161m) to supply AC power to the selected at least one coil using a power conversion circuit corresponding to the selected at least one coil.

According to various embodiments, each of the plurality of coil selection switches (e.g., 161a, . . . 161m) may be a level shifter (e.g., 901a, 901b, or 901m). The processor (e.g., the transmission IC 110) may be a circuit for controlling each of the plurality of coil selection switches (e.g., 161a, . . . 161m) and be configured to apply a driving voltage and/or an enable signal to a first level shifter corresponding to the selected at least one coil and refrain from applying the driving voltage and/or the enable signal to at least one second level shifter corresponding to the at least one remaining coil.

According to various embodiments, the electronic device 101 may further comprise a converter (e.g., 120). The plurality of power conversion circuits (e.g., 150a, . . . 150m) may include a plurality of gate drivers and a plurality of inverters, respectively. The processor (e.g., the transmission IC 110) may be configured to provide a pulse to each of the plurality of coil selection switches. The first level shifter receiving the driving voltage and/or the enable signal may be configured to change a level of the pulse and provide the level-changed pulse to a first gate driver corresponding to the first level shifter among the plurality of gate drivers. The first gate driver may be configured to provide a driving signal to a gate of a transistor of a first inverter corresponding to the first gate driver among the plurality of inverters using the level-changed pulse. The first inverter may be configured to provide AC power to the selected at least one coil based on the driving signal and a driving voltage from the converter. An output signal may not be provided from the at least one second level shifter not receiving the driving voltage and/or the enable signal.

According to various embodiments, the processor (e.g., the transmission IC 110) may be a circuit for controlling each of the plurality of coil selection switches and be configured to control a first coil selection switch corresponding to the selected at least one coil in an on state to allow the processor (e.g., the transmission IC 110) to be connected to the at least one coil and control at least one second coil selection switch corresponding to the at least one remaining coil in an off state to allow the processor (e.g., the transmission IC 110) not to be connected to the at least one remaining coil.

According to various embodiments, the electronic device 101 may further comprise an additional processor (e.g., the transmission IC 110). The processor (e.g., the transmission IC 110) may be further configured to transmit information about the selected at least one coil to the additional processor (e.g., the transmission IC 110) and, upon receiving a power transfer command from the additional processor (e.g., the transmission IC 110), perform charging using the selected at least one coil.

According to various embodiments, the processor (e.g., the transmission IC 110) may be configured to sequentially receive ping start commands for the plurality of coils (e.g., 151a, . . . 151m), respectively, from the additional processor (e.g., the transmission IC 110) and sequentially apply ping signals to the plurality of coils (e.g., 151a, . . . 151m), respectively, based on the ping start commands from the additional processor (e.g., the transmission IC 110).

According to various embodiments, the processor (e.g., the transmission IC 110) may be a circuit for selecting a coil for operation from among the plurality of coils (e.g., 151a, . . . 151m) and be configured to identify information indicating a magnitude of each of the ping signals received by the external electronic device (e.g., the wireless power reception device 195), based on a result of demodulation of signals respectively output from the plurality of coils (e.g., 151a, . . . 151m) while sequentially applying the ping signals to the plurality of coils, respectively and select a coil for operation from among the plurality of coils (e.g., 151a, . . . 151m) based on information indicating the magnitude of each of the ping signals received by the external electronic device (e.g., the wireless power reception device 195).

According to various embodiments, the processor (e.g., the transmission IC 110) may be a circuit for selecting a coil for operation from among the plurality of coils (e.g., 151a, . . . 151m) and be configured to identify a magnitude of each of currents corresponding to the each of the plurality of coils (e.g., 151a, . . . 151m) while sequentially applying the ping signals to the plurality of coils, respectively and select the coil for operation from among the plurality of coils (e.g., 151a, . . . 151m) based on the magnitude of the each of the currents corresponding to the each of the plurality of coils (e.g., 151a, . . . 151m).

According to various embodiments, the electronic device 101 may further comprise an additional processor (e.g., the MCU 1005). The processor (e.g., the transmission IC 110) may be further configured to perform charging using the selected at least one coil and notify the additional processor (e.g., the MCU 1005) of charging using the selected at least one coil.

According to various embodiments, an electronic device 101 may comprise a first group of coils (e.g., 1016a, 1016b, and 1016c), a first power conversion circuit (e.g., at least one of the gate drivers 1014a, 1014b, and 1014c or the inverters 1015a, 1015b, and 1015c) electrically connected with the first group of coils (e.g., 1016a, 1016b, and 1016c) to supply AC power to generate a first electromagnetic field using at least one coil of the first group of coils, a second group of coils (e.g., 1026a, 1026b, and 1026c), a second power conversion circuit (e.g., at least one of the gate drivers 1024a, 1024b, and 1024c or the inverters 1025a, 1025b, and 1025c) electrically connected with the second group of coils (e.g., 1026a, 1026b, and 1026c) to supply AC power to generate a second electromagnetic field using at least one coil of the second group of coils (e.g., 1026a, 1026b, and 1026c), and at least one processor (e.g., at least one of the MCU 1005, the first transmission IC 1012, or the second transmission IC 1022) operatively connected to the first power conversion circuit and the second power conversion circuit (e.g., at least one of the gate drivers 1024a, 1024b, and 1024c or the inverters 1025a, 1025b, and 1025c). The at least one processor (e.g., at least one of the MCU 1005, the first transmission IC 1012, or the second transmission IC 1022) may be configured to supply AC power to at least one or more coils of the first group of coils (e.g., 1016a, 1016b, and 1016c) using the first power conversion circuit, supply AC power to at least one or more coils of the second group of coils using the second power conversion circuit, receive first information about the first group of coils (e.g., 1016a, 1016b, and 1016c), receive second information about the second group of coils (e.g., 1026a, 1026b, and 1026c), select a coil to perform charging of a first coil of the first group of coils (e.g., 1016a, 1016b, and 1016c) or a second coil of the second group of coils (e.g., 1026a, 1026b, and 1026c) based on a result of comparing the first information and the second information, and control the first power conversion circuit or the second power conversion circuit (e.g., at least one of the gate drivers 1024a, 1024b, and 1024c or the inverters 1025a, 1025b, and 1025c) to charge with the selected coil.

According to various embodiments, the at least one processor (e.g., at least one of the MCU 1005, the first transmission IC 1012, or the second transmission IC 1022) may be configured to sequentially apply a first ping signal to each of the first group of coils (e.g., 1016*a*, 1016*b*, and 1016*c*) and sequentially apply a second ping signal to each of the second group of coils (e.g., 1026*a*, 1026*b*, and 1026*c*).

According to various embodiments, the at least one processor (e.g., at least one of the MCU 1005, the first transmission IC 1012, or the second transmission IC 1022) may be configured to alternately perform application of the first ping signal and application of the second ping signal.

According to various embodiments, the at least one processor (e.g., at least one of the MCU 1005, the first transmission IC 1012, or the second transmission IC 1022) may be further configured to identify first information indicating a magnitude of the first ping signal received by an external electronic device (e.g., the wireless power reception device 195) based on a result of demodulation of the respective signals of the first group of coils (e.g., 1016*a*, 1016*b*, and 1016*c*) while sequentially applying the first ping signal to each of the first group of coils (e.g., 1016*a*, 1016*b*, and 1016*c*) and select the first coil based on the first information and be further configured to identify second information indicating a magnitude of the second ping signal received by the external electronic device (e.g., the wireless power reception device 195) based on a result of demodulation of the respective signals of the second group of coils (e.g., 1026*a*, 1026*b*, and 1026*c*) while sequentially applying the second ping signal to each of the second group of coils (e.g., 1026*a*, 1026*b*, and 1026*c*) and select the second coil based on the second information.

According to various embodiments, the at least one processor (e.g., at least one of the MCU 1005, the first transmission IC 1012, or the second transmission IC 1022) may be configured to receive a first magnitude of the first ping signal received by the external electronic device (e.g., the wireless power reception device 195) corresponding to the first coil, as the first information, receive a second magnitude of the second ping signal received by the external electronic device (e.g., the wireless power reception device 195) corresponding to the second coil, as the second information, and select a coil to perform charging based on a result of comparison between the first magnitude and the second magnitude.

According to various embodiments, the at least one processor (e.g., at least one of the MCU 1005, the first transmission IC 1012, or the second transmission IC 1022) may be further configured to identify first magnitudes corresponding to currents respectively applied to the first group of coils (e.g., 1016*a*, 1016*b*, and 1016*c*) while sequentially applying the first ping signal to each of the first group of coils (e.g., 1016*a*, 1016*b*, and 1016*c*) and select the first coil based on the first magnitudes and be further configured to identify second magnitudes corresponding to currents respectively applied to the second group of coils (e.g., 1026*a*, 1026*b*, and 1026*c*) while sequentially applying each of the ping signals to each of the second group of coils (e.g., 1026*a*, 1026*b*, and 1026*c*) and select the second coil based on the second magnitudes.

A method for operating an electronic device 101 comprising a plurality of coils (e.g., 151*a*, . . . 151*m*), a plurality of power conversion circuits (e.g., 150*a*, . . . 150*m*) configured to respectively receive DC power, convert the DC power into AC power, and output the AC power to the plurality of coils (e.g., 151*a*, . . . 151*m*), respectively, a plurality of demodulation switches (e.g., 152*a*, . . . 152*m*) configured to connect demodulation paths, which respectively correspond to the plurality of coils (e.g., 151*a*, . . . 151*m*) selectively to a ground, and a processor (e.g., the transmission IC 110) may comprise selecting at least one coil from among the plurality of coils (e.g., 151*a*, . . . 151*m*), controlling an on/off state of each of the plurality of demodulation switches (e.g., 152*a*, . . . 152*m*) to allow a demodulation path corresponding to at least one remaining coil except for the selected at least one coil among the plurality of coils (e.g., 151*a*, . . . 151*m*) to be connected to the ground and to allow a demodulation path corresponding to the selected at least one coil not to be connected to the ground, supplying the AC power to the selected at least one coil, and demodulate a signal of the selected at least one coil and identifying information from an external electronic device (e.g., the wireless power reception device 195) disposed corresponding to the selected at least one coil based on a result of the demodulation.

According to various embodiments, the electronic device 101 may further comprise a plurality of coil selection switches, wherein each of the plurality of coil selection switches is configured to connect the processor (e.g., the transmission IC 110) and the plurality of power conversion circuits (e.g., 150*a*, . . . 150*m*) selectively. The method for operating the electronic device 101 may further comprise controlling a first coil selection switch corresponding to the selected at least one coil in an on state to allow the processor (e.g., the transmission IC 110) to be connected to the selected at least one coil and controlling at least one second coil selection switch corresponding to the at least one remaining coil in an off state to allow the processor (e.g., the transmission IC 110) not to be connected to the at least one remaining coil.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device 101). For example, a processor of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a plurality of coils;
a plurality of power conversion circuits configured to respectively receive DC power, convert the DC power into AC power, and output the AC power to the plurality of coils, respectively;
a plurality of demodulation switches configured to selectively connect demodulation paths, which respectively correspond to the plurality of coils, to ground;
a plurality of rectifiers respectively connected to the plurality of coils, wherein the plurality of rectifiers generate rectified signals respectively output from the plurality of coils and output the rectified signals, respectively, and
a processor configured to:
select at least one coil from among the plurality of coils;
control an on/off state of each of the plurality of demodulation switches to allow a first demodulation path corresponding to at least one remaining coil except for the selected at least one coil among the plurality of coils to be connected to the ground and to allow a second demodulation path corresponding to the selected at least one coil not to be connected to the ground;
supply the AC power to the selected at least one coil; and
demodulate a signal of the selected at least one coil and identify information from an external electronic device disposed corresponding to the selected at least one coil based on a result of the demodulation.

2. The electronic device of claim 1, wherein the processor is a circuit for controlling the on/off state of each of the plurality of demodulation switches and is configured to:
control a first group of demodulation switches corresponding to the at least one remaining coil except for the selected at least one coil in an on state to allow the first demodulation path corresponding to the at least one remaining coil to be connected to the ground; and
control a second group of demodulation switches corresponding to the selected at least one coil in an off state to allow the second demodulation path corresponding to the selected at least one coil not to be connected to the ground.

3. The electronic device of claim 1, further comprising:
at least one filter respectively connected to the plurality of rectifiers, wherein the at least one filter respectively filters the rectified signals to generate filtered signals, and provides the filtered signals to the processor,
wherein the plurality of demodulation switches are connected between the plurality of coils and the plurality of rectifiers, respectively.

4. The electronic device of claim 1, further comprising a plurality of coil selection switches,
wherein each of the plurality of coil selection switches is configured to connect the processor and the plurality of power conversion circuits selectively,
wherein the processor is further configured to control each of the plurality of coil selection switches to supply AC power to the selected at least one coil using a power conversion circuit corresponding to the selected at least one coil.

5. The electronic device of claim 4, wherein each of the plurality of coil selection switches is a level shifter, and wherein the processor is a circuit for controlling each of the plurality of coil selection switches and is configured to: apply one or both of a driving voltage and an enable signal to a first level shifter corresponding to the selected at least one coil; and refrain from applying one or both of the driving voltage and the enable signal to at least one second level shifter corresponding to the at least one remaining coil.

6. The electronic device of claim 5, further comprising a converter, wherein the plurality of power conversion circuits include a plurality of gate drivers and a plurality of inverters, respectively, wherein the processor is configured to provide a pulse to each of the plurality of coil selection switches, wherein the first level shifter receiving the driving voltage and/or the enable signal is configured to change a level of the pulse and provide the level-changed pulse to a first gate driver corresponding to the first level shifter among the plurality of gate drivers, wherein the first gate driver is configured to provide a driving signal to a gate of a transistor of a first inverter corresponding to the first gate driver among the plurality of inverters using the level-changed pulse, wherein the first inverter is configured to provide AC power to the selected at least one coil based on the driving signal and a driving voltage from the converter, and wherein an output signal is not provided from the at least one second level shifter not receiving the driving voltage and/or the enable signal.

7. The electronic device of claim 4, wherein the processor is a circuit for controlling each of the plurality of coil selection switches and is configured to: control a first coil selection switch corresponding to the selected at least one coil in an on state to allow the processor to be connected to the at least one coil; and control at least one second coil selection switch corresponding to the at least one remaining coil in an off state to allow the processor not to be connected to the at least one remaining coil.

8. The electronic device of claim 1, further comprising an additional processor,
wherein the processor is further configured to:
transmit the information about the selected at least one coil to the additional processor; and
upon receiving a power transfer command from the additional processor, perform charging using the selected at least one coil.

9. The electronic device of claim 8, wherein the processor is configured to:
sequentially receive ping start commands for the plurality of coils, respectively, from the additional processor; and
sequentially apply ping signals to the plurality of coils, respectively, based on the ping start commands from the additional processor.

10. The electronic device of claim 8, wherein the processor is a circuit for selecting a coil for operation from among the plurality of coils and is configured to:
Identify the information indicating a magnitude of each of the ping signals received by the external electronic device, based on a result of demodulation of signals respectively output from the plurality of coils while sequentially applying the ping signals to the plurality of coils, respectively; and
select a coil for operation from among the plurality of coils based on information indicating the magnitude of each of the ping signals received by the external electronic device.

11. The electronic device of claim 8, wherein the processor is a circuit for selecting a coil for operation from among the plurality of coils and is configured to:
identify a magnitude of currents corresponding to the each of the plurality of coils while sequentially applying the ping signals to the plurality of coils, respectively; and
select the coil for operation from among the plurality of coils based on the magnitude of the each of the currents corresponding to the each of the plurality of coils.

12. The electronic device of claim 1, further comprising an additional processor,
wherein the processor is further configured to:
perform charging using the selected at least one coil; and
notify the additional processor of charging using the selected at least one coil.

\* \* \* \* \*